(12) United States Patent
Haegermarck

(10) Patent No.: US 10,518,416 B2
(45) Date of Patent: Dec. 31, 2019

(54) METHOD FOR DETECTING A MEASUREMENT ERROR IN A ROBOTIC CLEANING DEVICE

(71) Applicant: Aktiebolaget Electrolux, Stockholm (SE)

(72) Inventor: Anders Haegermarck, Trångsund (SE)

(73) Assignee: Aktiebolaget Electrolux (SE)

( * ) Notice: Subject to any disclaimer, the term of this patent is extended or adjusted under 35 U.S.C. 154(b) by 103 days.

(21) Appl. No.: 15/321,333

(22) PCT Filed: Dec. 17, 2014

(86) PCT No.: PCT/EP2014/078144
§ 371 (c)(1),
(2) Date: Dec. 22, 2016

(87) PCT Pub. No.: WO2016/005012
PCT Pub. Date: Jan. 14, 2016

(65) Prior Publication Data
US 2017/0197315 A1    Jul. 13, 2017

(30) Foreign Application Priority Data
Jul. 10, 2014  (SE) ...................................... 1450886

(51) Int. Cl.
*B25J 9/16* (2006.01)
*G05D 1/02* (2006.01)

(52) U.S. Cl.
CPC .......... *B25J 9/1692* (2013.01); *G05D 1/0248* (2013.01); *G05D 1/0272* (2013.01); *G05D 2201/0203* (2013.01)

(58) Field of Classification Search
CPC ..... B25J 9/1692; B25J 9/1679; G05D 1/0248; G05D 1/0272; G05D 2201/0203; G05B 19/401
(Continued)

(56) References Cited

U.S. PATENT DOCUMENTS 1,286,321 A   12/1918  Hoover
1,401,007 A   12/1921  Staples
(Continued)

FOREIGN PATENT DOCUMENTS

CA   2154758   6/1995
CN   1116818   2/1996
(Continued)

OTHER PUBLICATIONS

Position_Definition of Position by Merriam-Webster.pdf (Position | Definition of Position by Merriam-Webster, Oct. 16, 2018, Merriam-Webster, https://www.merriam-webster.com/dictionary/position, pp. 1-15).*

(Continued)

*Primary Examiner* — Bao Long T Nguyen
(74) *Attorney, Agent, or Firm* — RatnerPrestia

(57) ABSTRACT

A robotic cleaning device having a main body, a propulsion system, a contact detecting portion connected to the main body, a dead reckoning sensor operatively connected to the propulsion system and an obstacle detecting device comprising a camera and a first structured light source arranged at a distance from each other on the main body. The robotic cleaning device may further include a processing unit arranged to control the propulsion system. The obstacle detecting device and the processing unit are arranged to estimate a distance to the landmark and to subsequently move the robotic cleaning device into contact with the landmark while measuring an actual distance to the landmark, whereby the actual distance is then compared with the estimated distance to determine a measurement error.

17 Claims, 5 Drawing Sheets

(58) Field of Classification Search
USPC .................................. 700/259, 254; 702/158
See application file for complete search history.

(56) References Cited

U.S. PATENT DOCUMENTS

| | | |
|---|---|---|
| 3,010,129 A | 11/1961 | Moore |
| 3,233,274 A | 2/1966 | Kroll |
| 3,550,714 A | 12/1970 | Bellinger |
| 3,570,227 A | 3/1971 | Bellinger |
| 3,713,505 A | 1/1973 | Muller |
| 3,837,028 A | 9/1974 | Bridge |
| 4,028,765 A | 6/1977 | Liebscher |
| 4,036,147 A | 7/1977 | Westling |
| 4,114,711 A | 9/1978 | Wilkins |
| 4,119,900 A | 10/1978 | Kremnitz |
| 4,306,174 A | 12/1981 | Mourier |
| 4,306,329 A | 12/1981 | Yokoi |
| 4,369,543 A | 1/1983 | Chen |
| 4,502,173 A | 3/1985 | Patzold |
| 4,627,511 A | 12/1986 | Yajima |
| 4,647,209 A | 3/1987 | Neukomm |
| 4,800,978 A | 1/1989 | Wasa |
| 4,822,450 A | 4/1989 | Davis |
| 4,825,091 A | 4/1989 | Breyer |
| 4,836,905 A | 6/1989 | Davis |
| 4,838,990 A | 6/1989 | Jucha |
| 4,842,686 A | 6/1989 | Davis |
| 4,849,067 A | 7/1989 | Jucha |
| 4,854,000 A | 8/1989 | Takimoto |
| 4,864,511 A | 9/1989 | Moy |
| 4,872,938 A | 10/1989 | Davis |
| 4,878,003 A | 10/1989 | Knepper |
| 4,886,570 A | 12/1989 | Davis |
| 4,918,607 A * | 4/1990 | Wible .................. G01S 17/74 180/169 |
| 4,919,224 A | 4/1990 | Shyu |
| 4,922,559 A | 5/1990 | Wall |
| 4,959,192 A | 9/1990 | Trundle |
| 4,962,453 A | 10/1990 | Pong |
| 4,989,818 A | 2/1991 | Trundle |
| 5,001,635 A | 3/1991 | Yasutomi |
| 5,006,302 A | 4/1991 | Trundle |
| 5,023,444 A | 6/1991 | Ohman |
| 5,032,775 A | 7/1991 | Mizuno |
| 5,034,673 A | 7/1991 | Shoji |
| 5,042,861 A | 8/1991 | Trundle |
| 5,045,118 A | 9/1991 | Mason |
| 5,086,535 A | 2/1992 | Grossmeyer |
| 5,095,577 A | 3/1992 | Jonas |
| 5,107,946 A | 4/1992 | Kamimura |
| 5,155,683 A | 10/1992 | Rahim |
| 5,243,732 A | 9/1993 | Koharagi |
| 5,245,177 A | 9/1993 | Schiller |
| 5,276,933 A | 1/1994 | Hennessey |
| 5,279,672 A | 1/1994 | Betker |
| 5,293,955 A | 3/1994 | Lee |
| 5,307,273 A | 4/1994 | Oh |
| 5,309,592 A | 5/1994 | Hiratsuka |
| 5,341,540 A | 8/1994 | Soupert |
| 5,345,639 A | 9/1994 | Tanoue |
| 5,349,378 A | 9/1994 | Maali |
| 5,353,224 A | 10/1994 | Lee |
| 5,367,458 A * | 11/1994 | Roberts ................ G01C 15/002 180/169 |
| 5,369,347 A | 11/1994 | Yoo |
| 5,377,106 A | 12/1994 | Drunk |
| 5,390,627 A | 2/1995 | van der Berg |
| 5,398,632 A | 3/1995 | Goldbach |
| 5,402,051 A | 3/1995 | Fujiwara |
| 5,440,216 A | 8/1995 | Kim |
| 5,444,965 A | 8/1995 | Colens |
| 5,446,356 A | 8/1995 | Kim |
| 5,454,129 A | 10/1995 | Kell |
| 5,518,552 A | 5/1996 | Tanoue |
| 5,534,762 A | 7/1996 | Kim |
| 5,548,511 A | 8/1996 | Bancroft |
| 5,560,077 A | 10/1996 | Crotchett |
| 5,568,589 A | 10/1996 | Hwang |
| 5,621,291 A | 4/1997 | Lee |
| 5,646,494 A | 7/1997 | Han |
| 5,666,689 A | 9/1997 | Andersen |
| 5,682,313 A | 10/1997 | Edlund |
| 5,682,640 A | 11/1997 | Han |
| 5,687,294 A | 11/1997 | Jeong |
| 5,698,957 A | 12/1997 | Sowada |
| 5,745,946 A | 5/1998 | Thrasher |
| 5,758,298 A | 5/1998 | Guldner |
| 5,778,554 A | 7/1998 | Jones |
| 5,781,960 A | 7/1998 | Kilstrom |
| 5,787,545 A | 8/1998 | Colens |
| 5,815,880 A | 10/1998 | Nakanishi |
| 5,825,981 A | 10/1998 | Matsuda |
| 5,841,259 A | 11/1998 | Kim |
| 5,852,984 A | 12/1998 | Matsuyama |
| 5,867,800 A | 2/1999 | Leif |
| 5,890,250 A | 4/1999 | Lange |
| 5,896,488 A | 4/1999 | Jeong |
| 5,903,124 A | 5/1999 | Kawakami |
| 5,926,909 A | 7/1999 | McGee |
| 5,933,902 A | 8/1999 | Frey |
| 5,935,179 A | 8/1999 | Kleiner |
| 5,940,927 A | 8/1999 | Haegermarck |
| 5,942,869 A | 8/1999 | Katou |
| 5,947,051 A | 9/1999 | Geiger |
| 5,959,423 A | 9/1999 | Nakanishi |
| 5,959,424 A | 9/1999 | Elkmann |
| 5,966,765 A | 10/1999 | Hamada |
| RE36,391 E | 11/1999 | vandenBerg |
| 5,983,833 A | 11/1999 | van der Lely |
| 5,987,696 A | 11/1999 | Wang |
| 5,991,951 A | 11/1999 | Kubo |
| 5,995,884 A | 11/1999 | Allen |
| 5,997,670 A | 12/1999 | Walter |
| 5,999,865 A * | 12/1999 | Bloomquist ......... G05D 1/0248 299/1.05 |
| 6,012,470 A | 1/2000 | Jones |
| 6,024,107 A | 2/2000 | Jones |
| 6,064,926 A | 5/2000 | Sarangapani |
| 6,076,662 A | 6/2000 | Bahten |
| 6,082,377 A | 7/2000 | Frey |
| 6,124,694 A | 9/2000 | Bancroft |
| 6,142,252 A | 11/2000 | Kinto |
| 6,176,067 B1 | 1/2001 | Bahten |
| 6,213,136 B1 | 4/2001 | Jones |
| 6,226,830 B1 | 5/2001 | Hendriks |
| 6,230,360 B1 | 5/2001 | Singleton |
| 6,251,551 B1 | 6/2001 | Kunze-Concewitz |
| 6,255,793 B1 | 7/2001 | Peless |
| 6,263,989 B1 | 7/2001 | Won |
| 6,300,737 B1 | 10/2001 | Bergvall |
| 6,311,366 B1 | 11/2001 | Sepke |
| 6,327,741 B1 | 12/2001 | Reed |
| 6,339,735 B1 | 1/2002 | Peless |
| 6,358,325 B1 | 3/2002 | Andreas |
| 6,360,801 B1 | 3/2002 | Walter |
| 6,370,452 B1 | 4/2002 | Pfister |
| 6,370,453 B2 | 4/2002 | Sommer |
| 6,381,801 B1 | 5/2002 | Clemons, Sr. |
| 6,389,329 B1 | 5/2002 | Colens |
| 6,413,149 B1 | 7/2002 | Wada |
| 6,417,641 B2 | 7/2002 | Peless |
| 6,431,296 B1 | 8/2002 | Won |
| 6,438,456 B1 | 8/2002 | Feddema |
| 6,443,509 B1 | 9/2002 | Levin |
| 6,457,199 B1 | 10/2002 | Frost |
| 6,457,206 B1 | 10/2002 | Judson |
| 6,459,955 B1 | 10/2002 | Bartsch |
| 6,465,982 B1 | 10/2002 | Bergvall |
| 6,481,515 B1 | 11/2002 | Kirkpatrick |
| 6,482,678 B1 | 11/2002 | Frost |
| 6,493,612 B1 | 12/2002 | Bisset |
| 6,493,613 B2 | 12/2002 | Peless |
| 6,496,754 B2 | 12/2002 | Song |
| 6,504,610 B1 | 1/2003 | Bauer |

(56) References Cited

U.S. PATENT DOCUMENTS

| | | |
|---|---|---|
| 6,519,804 B1 | 2/2003 | Vujik |
| 6,525,509 B1 | 2/2003 | Petersson |
| D471,243 S | 3/2003 | Cioffi |
| 6,532,404 B2 | 3/2003 | Colens |
| 6,535,793 B2 | 3/2003 | Allard |
| 6,571,415 B2 | 6/2003 | Gerber |
| 6,580,246 B2 | 6/2003 | Jacobs |
| 6,581,239 B1 | 6/2003 | Dyson |
| 6,594,844 B2 | 7/2003 | Jones |
| 6,597,143 B2 | 7/2003 | Song |
| 6,601,265 B1 | 8/2003 | Burlington |
| 6,605,156 B1 | 8/2003 | Clark |
| 6,609,962 B1 | 8/2003 | Wakabayashi |
| 6,611,120 B2 | 8/2003 | Song |
| 6,611,318 B2 | 8/2003 | LaPolice |
| 6,615,108 B1 | 9/2003 | Peless |
| 6,615,885 B1 | 9/2003 | Ohm |
| 6,633,150 B1 | 10/2003 | Wallach |
| 6,637,446 B2 | 10/2003 | Frost |
| 6,658,325 B2 | 12/2003 | Zweig |
| 6,661,239 B1 | 12/2003 | Ozick |
| 6,662,889 B2 | 12/2003 | De Fazio |
| 6,667,592 B2 | 12/2003 | Jacobs |
| 6,668,951 B2 | 12/2003 | Won |
| 6,671,592 B1 | 12/2003 | Bisset |
| 6,690,134 B1 | 2/2004 | Jones |
| 6,726,823 B1 | 4/2004 | Wang |
| 6,732,826 B2 | 5/2004 | Song |
| 6,745,431 B2 | 6/2004 | Dijksman |
| 6,748,297 B2 | 6/2004 | Song |
| 6,769,004 B2 | 7/2004 | Barrett |
| 6,774,596 B1 | 8/2004 | Bisset |
| 6,775,871 B1 | 8/2004 | Finch |
| 6,781,338 B2 | 8/2004 | Jones |
| 6,809,490 B2 | 10/2004 | Jones |
| 6,810,305 B2 | 10/2004 | Kirkpatrick, Jr. |
| 6,820,801 B2 | 11/2004 | Kaneko |
| 6,841,963 B2 | 1/2005 | Song |
| 6,845,297 B2 | 1/2005 | Allard |
| 6,850,024 B2 | 2/2005 | Peless |
| 6,859,010 B2 | 2/2005 | Jeon |
| 6,859,976 B2 | 3/2005 | Plankenhorn |
| 6,860,206 B1 | 3/2005 | Rudakevych |
| 6,868,307 B2 | 3/2005 | Song |
| 6,869,633 B2 | 3/2005 | Sus |
| 6,870,792 B2 | 3/2005 | Chiappetta |
| 6,882,334 B1 | 4/2005 | Meyer |
| 6,883,201 B2 | 4/2005 | Jones |
| 6,885,912 B2 | 4/2005 | Peless |
| 6,901,624 B2 | 6/2005 | Mori |
| 6,925,679 B2 | 8/2005 | Wallach |
| D510,066 S | 9/2005 | Hickey |
| 6,938,298 B2 | 9/2005 | Aasen |
| 6,939,208 B2 | 9/2005 | Kamimura |
| 6,940,291 B1 | 9/2005 | Ozick |
| 6,941,199 B1 | 9/2005 | Bottomley |
| 6,942,548 B2 | 9/2005 | Wada |
| 6,956,348 B2 | 10/2005 | Landry |
| 6,957,712 B2 | 10/2005 | Song |
| 6,964,312 B2 | 11/2005 | Maggio |
| 6,965,209 B2 | 11/2005 | Jones |
| 6,967,275 B2 | 11/2005 | Ozick |
| 6,971,140 B2 | 12/2005 | Kim |
| 6,971,141 B1 | 12/2005 | Tak |
| 6,984,952 B2 | 1/2006 | Peless |
| 7,000,623 B2 | 2/2006 | Welsh |
| 7,004,269 B2 | 2/2006 | Song |
| 7,013,200 B2 | 3/2006 | Wakui |
| 7,013,527 B2 | 3/2006 | Thomas, Sr. |
| 7,015,831 B2 | 3/2006 | Karlsson |
| 7,024,278 B2 | 4/2006 | Chiappetta |
| 7,031,805 B2 | 4/2006 | Lee |
| 7,040,968 B2 | 5/2006 | Kamimura |
| 7,042,342 B2 | 5/2006 | Luo |
| 7,043,794 B2 | 5/2006 | Conner |
| 7,050,926 B2* | 5/2006 | Theurer .................. G01S 17/88 33/287 |
| 7,053,578 B2 | 5/2006 | Diehl et al. |
| 7,053,580 B2 | 5/2006 | Aldred |
| 7,054,716 B2 | 5/2006 | McKee |
| 7,059,012 B2 | 6/2006 | Song |
| 7,079,923 B2 | 7/2006 | Abramson |
| 7,082,350 B2 | 7/2006 | Skoog |
| D526,753 S | 8/2006 | Tani |
| 7,085,624 B2 | 8/2006 | Aldred |
| 7,103,449 B2 | 9/2006 | Woo |
| 7,113,847 B2 | 9/2006 | Chmura |
| 7,117,067 B2 | 10/2006 | McLurkin |
| 7,133,745 B2 | 11/2006 | Wang |
| 7,134,164 B2 | 11/2006 | Alton |
| 7,135,992 B2 | 11/2006 | Karlsson |
| 7,143,696 B2 | 12/2006 | Rudakevych |
| 7,145,478 B2 | 12/2006 | Goncalves |
| 7,150,068 B1 | 12/2006 | Ragner |
| 7,155,308 B2 | 12/2006 | Jones |
| 7,155,309 B2 | 12/2006 | Peless |
| 7,162,338 B2 | 1/2007 | Goncalves |
| 7,167,775 B2 | 1/2007 | Abramson |
| 7,173,391 B2 | 2/2007 | Jones |
| 7,174,238 B1 | 2/2007 | Zweig |
| 7,177,737 B2 | 2/2007 | Karlsson |
| 7,184,586 B2 | 2/2007 | Jeon |
| 7,185,396 B2 | 3/2007 | Im |
| 7,185,397 B2 | 3/2007 | Stuchlik |
| 7,188,000 B2 | 3/2007 | Chiappetta |
| 7,196,487 B2 | 3/2007 | Jones |
| 7,199,711 B2 | 4/2007 | Field |
| 7,200,892 B2 | 4/2007 | Kim |
| 7,202,630 B2 | 4/2007 | Dan |
| 7,206,677 B2 | 4/2007 | Hulden |
| 7,207,081 B2 | 4/2007 | Gerber |
| 7,208,892 B2 | 4/2007 | Tondra |
| 7,213,298 B2 | 5/2007 | Cipolla |
| 7,213,663 B2 | 5/2007 | Kim |
| 7,222,390 B2 | 5/2007 | Cipolla |
| 7,225,500 B2 | 6/2007 | Diehl |
| 7,237,298 B2 | 7/2007 | Reindle |
| 7,240,396 B2 | 7/2007 | Thomas, Sr. |
| 7,246,405 B2 | 7/2007 | Yan |
| 7,248,951 B2 | 7/2007 | Hulden |
| 7,251,853 B2 | 8/2007 | Park |
| 7,254,464 B1 | 8/2007 | McLurkin |
| 7,254,859 B2 | 8/2007 | Gerber |
| 7,269,877 B2 | 9/2007 | Tondra |
| 7,272,467 B2 | 9/2007 | Goncalves |
| 7,272,868 B2 | 9/2007 | Im |
| 7,274,167 B2 | 9/2007 | Kim |
| 7,275,280 B2 | 10/2007 | Haegermarck |
| 7,288,912 B2 | 10/2007 | Landry |
| D556,961 S | 12/2007 | Swyst |
| 7,303,776 B2 | 12/2007 | Sus |
| 7,324,870 B2 | 1/2008 | Lee |
| 7,331,436 B1 | 2/2008 | Pack |
| 7,332,890 B2 | 2/2008 | Cohen |
| 7,343,221 B2 | 3/2008 | Ann |
| 7,343,719 B2 | 3/2008 | Sus |
| 7,346,428 B1 | 3/2008 | Huffman |
| 7,349,759 B2 | 3/2008 | Peless |
| 7,359,766 B2 | 4/2008 | Jeon |
| 7,363,994 B1 | 4/2008 | DeFazio |
| 7,369,460 B2 | 5/2008 | Chiappetta |
| 7,372,004 B2 | 5/2008 | Buchner |
| 7,388,343 B2 | 6/2008 | Jones |
| 7,389,156 B2 | 6/2008 | Ziegler |
| 7,389,166 B2 | 6/2008 | Harwig |
| 7,403,360 B2 | 7/2008 | Cunningham |
| 7,412,748 B2 | 8/2008 | Lee |
| 7,417,404 B2 | 8/2008 | Lee |
| 7,418,762 B2 | 9/2008 | Arai |
| 7,424,766 B2 | 9/2008 | Reindle |
| 7,429,843 B2 | 9/2008 | Jones |
| 7,430,455 B2 | 9/2008 | Casey |
| 7,438,766 B2 | 10/2008 | Song |
| 7,441,298 B2 | 10/2008 | Svendsen |

(56) References Cited

U.S. PATENT DOCUMENTS

| | | | |
|---|---|---|---|
| 7,444,206 | B2 | 10/2008 | Abramson |
| 7,448,113 | B2 | 11/2008 | Jones |
| 7,459,871 | B2 | 12/2008 | Landry |
| 7,464,157 | B2 | 12/2008 | Okude |
| 7,474,941 | B2 | 1/2009 | Kim |
| 7,480,958 | B2 | 1/2009 | Song |
| 7,480,960 | B2 | 1/2009 | Kim |
| D586,959 | S | 2/2009 | Geringer |
| 7,489,277 | B2 | 2/2009 | Sung |
| 7,489,985 | B2 | 2/2009 | Ko |
| 7,499,774 | B2 | 3/2009 | Barrett |
| 7,499,775 | B2 | 3/2009 | Filippov |
| 7,499,776 | B2 | 3/2009 | Allard |
| 7,499,804 | B2 | 3/2009 | Svendsen |
| 7,503,096 | B2 | 3/2009 | Lin |
| 7,515,991 | B2 | 4/2009 | Egawa |
| D593,265 | S | 5/2009 | Carr |
| 7,539,557 | B2 | 5/2009 | Yamauchi |
| 7,546,891 | B2 | 6/2009 | Won |
| 7,546,912 | B1 | 6/2009 | Pack |
| 7,555,363 | B2 | 6/2009 | Augenbraun |
| 7,556,108 | B2 | 7/2009 | Won |
| 7,559,269 | B2 | 7/2009 | Rudakevych |
| 7,564,571 | B2 | 7/2009 | Karabassi |
| 7,566,839 | B2 | 7/2009 | Hukuba |
| 7,567,052 | B2 | 7/2009 | Jones |
| 7,568,259 | B2 | 8/2009 | Yan |
| 7,568,536 | B2 | 8/2009 | Yu |
| 7,571,511 | B2 | 8/2009 | Jones |
| 7,573,403 | B2 | 8/2009 | Goncalves |
| 7,574,282 | B2 | 8/2009 | Petersson |
| 7,578,020 | B2 | 8/2009 | Jaworski |
| 7,579,803 | B2 | 8/2009 | Jones |
| 7,581,282 | B2 | 9/2009 | Woo |
| 7,597,162 | B2 | 10/2009 | Won |
| 7,600,521 | B2 | 10/2009 | Woo |
| 7,600,593 | B2 | 10/2009 | Filippov |
| 7,603,744 | B2 | 10/2009 | Reindle |
| 7,604,675 | B2 | 10/2009 | Makarov |
| 7,610,651 | B2 | 11/2009 | Baek |
| 7,613,543 | B2 | 11/2009 | Petersson |
| 7,620,476 | B2 | 11/2009 | Morse |
| 7,636,982 | B2 | 12/2009 | Jones |
| 7,647,144 | B2 | 1/2010 | Haegermarck |
| 7,650,666 | B2 | 1/2010 | Jang |
| 7,654,348 | B2 | 2/2010 | Ohm |
| 7,660,650 | B2 | 2/2010 | Kawagoe |
| 7,663,333 | B2 | 2/2010 | Jones |
| 7,673,367 | B2 | 3/2010 | Kim |
| 7,679,532 | B2 | 3/2010 | Karlsson |
| 7,688,676 | B2 | 3/2010 | Chiappetta |
| 7,693,654 | B1 | 4/2010 | Dietsch |
| 7,697,141 | B2 | 4/2010 | Jones |
| 7,706,917 | B1 | 4/2010 | Chiappetta |
| 7,706,921 | B2 | 4/2010 | Jung |
| 7,709,497 | B2 | 5/2010 | Christensen, IV |
| 7,711,450 | B2 | 5/2010 | Im |
| 7,720,572 | B2 | 5/2010 | Ziegler |
| 7,721,829 | B2 | 5/2010 | Lee |
| 7,729,801 | B2 | 6/2010 | Abramson |
| 7,749,294 | B2 | 7/2010 | Oh |
| 7,751,940 | B2 | 7/2010 | Lee |
| 7,761,954 | B2 | 7/2010 | Ziegler |
| 7,765,635 | B2 | 8/2010 | Park |
| 7,765,638 | B2 | 8/2010 | Pineschi et al. |
| 7,769,490 | B2 | 8/2010 | Abramson |
| 7,774,158 | B2 | 8/2010 | Domingues Goncalves |
| 7,779,504 | B2 | 8/2010 | Lee |
| 7,780,796 | B2 | 8/2010 | Shim |
| 7,784,139 | B2 | 8/2010 | Sawalski |
| 7,784,570 | B2 | 8/2010 | Couture |
| 7,785,544 | B2 | 8/2010 | Alward |
| 7,787,991 | B2 | 8/2010 | Jeung |
| 7,793,614 | B2 | 9/2010 | Ericsson |
| 7,801,645 | B2 | 9/2010 | Taylor |
| 7,805,220 | B2 | 9/2010 | Taylor |
| 7,827,653 | B1 | 11/2010 | Liu |
| 7,832,048 | B2 | 11/2010 | Harwig |
| 7,835,529 | B2 | 11/2010 | Hernandez |
| 7,843,431 | B2 | 11/2010 | Robbins |
| 7,844,364 | B2 | 11/2010 | McLurkin |
| 7,849,555 | B2 | 12/2010 | Hahm |
| 7,856,291 | B2 | 12/2010 | Jung |
| 7,860,608 | B2 | 12/2010 | Lee |
| 7,861,365 | B2 | 1/2011 | Sun |
| 7,861,366 | B2 | 1/2011 | Hahm |
| 7,873,437 | B2 | 1/2011 | Aldred |
| 7,877,166 | B2 | 1/2011 | Harwig |
| 7,886,399 | B2 | 2/2011 | Dayton |
| 7,890,210 | B2 | 2/2011 | Choi |
| 7,891,045 | B2 | 2/2011 | Kim |
| 7,891,289 | B2 | 2/2011 | Day |
| 7,891,446 | B2 | 2/2011 | Couture |
| 7,894,951 | B2 | 2/2011 | Norris |
| 7,916,931 | B2 | 3/2011 | Lee |
| 7,920,941 | B2 | 4/2011 | Park |
| 7,921,506 | B2 | 4/2011 | Baek |
| 7,926,598 | B2 | 4/2011 | Rudakevych |
| 7,934,571 | B2 | 5/2011 | Chiu |
| 7,937,800 | B2 | 5/2011 | Yan |
| 7,942,107 | B2 | 5/2011 | Vosburgh |
| 7,957,837 | B2 | 6/2011 | Ziegler |
| 7,962,997 | B2 | 6/2011 | Chung |
| 7,966,339 | B2 | 6/2011 | Kim |
| 7,975,790 | B2 | 7/2011 | Kim |
| 7,979,175 | B2 | 7/2011 | Allard |
| 7,979,945 | B2 | 7/2011 | Dayton |
| 7,981,455 | B2 | 7/2011 | Sus |
| 7,997,118 | B2 | 8/2011 | Mecca |
| 8,001,651 | B2 | 8/2011 | Chang |
| 8,007,221 | B1 | 8/2011 | More |
| 8,010,229 | B2 | 8/2011 | Kim |
| 8,019,223 | B2 | 9/2011 | Hudson |
| 8,020,657 | B2 | 9/2011 | Allard |
| 8,032,978 | B2 | 10/2011 | Haegermarck |
| 8,034,390 | B2 | 10/2011 | Sus |
| 8,042,663 | B1 | 10/2011 | Pack |
| 8,046,103 | B2 | 10/2011 | Abramson |
| 8,061,461 | B2 | 11/2011 | Couture |
| 8,065,778 | B2 | 11/2011 | Kim |
| 8,073,439 | B2 | 12/2011 | Stromberg |
| 8,074,752 | B2 | 12/2011 | Rudakevych |
| 8,078,338 | B2 | 12/2011 | Pack |
| 8,079,432 | B2 | 12/2011 | Ohm |
| 8,082,836 | B2 | 12/2011 | More |
| 8,086,419 | B2 | 12/2011 | Goncalves |
| 8,087,117 | B2 | 1/2012 | Kapoor |
| 8,095,238 | B2 | 1/2012 | Jones |
| 8,095,336 | B2 | 1/2012 | Goncalves |
| 8,107,318 | B2 | 1/2012 | Chiappetta |
| 8,108,092 | B2 | 1/2012 | Phillips |
| 8,109,191 | B1 | 2/2012 | Rudakevych |
| 8,112,942 | B2 | 2/2012 | Bohm |
| 8,113,304 | B2 | 2/2012 | Won |
| 8,122,982 | B2 | 2/2012 | Morey |
| 8,127,396 | B2 | 3/2012 | Mangiardi |
| 8,127,399 | B2 | 3/2012 | Dilger |
| 8,127,704 | B2 | 3/2012 | Vosburgh |
| 8,136,200 | B2 | 3/2012 | Splinter |
| 8,150,650 | B2 | 4/2012 | Goncalves |
| D659,311 | S | 5/2012 | Geringer |
| 8,166,904 | B2 | 5/2012 | Israel |
| 8,195,333 | B2 | 6/2012 | Ziegler |
| 8,196,251 | B2 | 6/2012 | Lynch |
| 8,199,109 | B2 | 6/2012 | Robbins |
| 8,200,600 | B2 | 6/2012 | Rosenstein |
| 8,200,700 | B2 | 6/2012 | Moore |
| 8,237,389 | B2 | 8/2012 | Fitch |
| 8,237,920 | B2 | 8/2012 | Jones |
| 8,239,992 | B2 | 8/2012 | Schnittman |
| 8,244,469 | B2 | 8/2012 | Cheung |
| 8,253,368 | B2 | 8/2012 | Landry |
| 8,255,092 | B2 | 8/2012 | Phillips |
| 8,256,542 | B2 | 9/2012 | Couture |

(56) References Cited

U.S. PATENT DOCUMENTS

| | | |
|---|---|---|
| 8,265,793 B2 | 9/2012 | Cross |
| 8,274,406 B2 | 9/2012 | Karlsson |
| 8,281,703 B2 | 10/2012 | Moore |
| 8,281,731 B2 | 10/2012 | Vosburgh |
| 8,290,619 B2 | 10/2012 | McLurkin |
| 8,292,007 B2 | 10/2012 | DeFazio |
| 8,295,125 B2 | 10/2012 | Chiappetta |
| D670,877 S | 11/2012 | Geringer |
| 8,308,529 B2 | 11/2012 | DAmbra |
| 8,311,674 B2 | 11/2012 | Abramson |
| 8,316,971 B2 | 11/2012 | Couture |
| 8,318,499 B2 | 11/2012 | Fritchie |
| D672,928 S | 12/2012 | Swett |
| 8,322,470 B2 | 12/2012 | Ohm |
| 8,326,469 B2 | 12/2012 | Phillips |
| 8,327,960 B2 | 12/2012 | Couture |
| 8,336,479 B2 | 12/2012 | Vosburgh |
| 8,342,271 B2 | 1/2013 | Filippov |
| 8,347,088 B2 | 1/2013 | Moore |
| 8,347,444 B2 | 1/2013 | Schnittman |
| 8,350,810 B2 | 1/2013 | Robbins |
| 8,353,373 B2 | 1/2013 | Rudakevych |
| 8,364,309 B1 | 1/2013 | Bailey |
| 8,364,310 B2 | 1/2013 | Jones |
| 8,365,848 B2 | 2/2013 | Won |
| 8,368,339 B2 | 2/2013 | Jones |
| 8,370,985 B2 | 2/2013 | Schnittman |
| 8,374,721 B2 | 2/2013 | Halloran |
| 8,375,838 B2 | 2/2013 | Rudakevych |
| 8,378,613 B2 | 2/2013 | Landry |
| 8,380,350 B2 | 2/2013 | Ozick |
| 8,382,906 B2 | 2/2013 | Konandreas |
| 8,386,081 B2 | 2/2013 | Landry |
| 8,387,193 B2 | 3/2013 | Ziegler |
| 8,390,251 B2 | 3/2013 | Cohen |
| 8,392,021 B2 | 3/2013 | Konandreas |
| 8,396,592 B2 | 3/2013 | Jones |
| 8,396,611 B2 | 3/2013 | Phillips |
| 8,402,586 B2 | 3/2013 | Lavabre |
| 8,408,956 B1 | 4/2013 | Vosburgh |
| 8,412,377 B2 | 4/2013 | Casey |
| 8,413,752 B2 | 4/2013 | Page |
| 8,417,188 B1 | 4/2013 | Vosburgh |
| 8,417,383 B2 | 4/2013 | Ozick |
| 8,418,303 B2 | 4/2013 | Kapoor |
| 8,418,642 B2 | 4/2013 | Vosburgh |
| 8,428,778 B2 | 4/2013 | Landry |
| 8,433,442 B2 | 4/2013 | Friedman |
| D682,362 S | 5/2013 | Mozeika |
| 8,438,694 B2 | 5/2013 | Kim |
| 8,438,695 B2 | 5/2013 | Gilbert, Jr. |
| 8,438,698 B2 | 5/2013 | Kim |
| 8,447,440 B2 | 5/2013 | Phillips |
| 8,447,613 B2 | 5/2013 | Hussey |
| 8,452,448 B2 | 5/2013 | Pack |
| 8,453,289 B2 | 6/2013 | Lynch |
| 8,456,125 B2 | 6/2013 | Landry |
| 8,461,803 B2 | 6/2013 | Cohen |
| 8,463,438 B2 | 6/2013 | Jones |
| 8,473,140 B2 | 6/2013 | Norris |
| 8,474,090 B2 | 7/2013 | Jones |
| 8,478,442 B2 | 7/2013 | Casey |
| 8,485,330 B2 | 7/2013 | Pack |
| 8,505,158 B2 | 8/2013 | Han |
| 8,508,388 B2 | 8/2013 | Karlsson |
| 8,515,578 B2 | 8/2013 | Chiappetta |
| 8,516,651 B2 | 8/2013 | Jones |
| 8,525,995 B2 | 9/2013 | Jones |
| 8,527,113 B2 | 9/2013 | Yamauchi |
| 8,528,157 B2 | 9/2013 | Schnittman |
| 8,528,162 B2 | 9/2013 | Tang |
| 8,528,673 B2 | 9/2013 | More |
| 8,532,822 B2 | 9/2013 | Abramson |
| 8,533,144 B1 | 9/2013 | Reeser |
| 8,534,983 B2 | 9/2013 | Schoenfeld |
| 8,543,562 B2 | 9/2013 | Mule |
| 8,548,626 B2 | 10/2013 | Steltz |
| 8,551,254 B2 | 10/2013 | Dayton |
| 8,551,421 B2 | 10/2013 | Luchinger |
| 8,565,920 B2 | 10/2013 | Casey |
| 8,572,799 B2 | 11/2013 | Won |
| 8,584,305 B2 | 11/2013 | Won |
| 8,584,306 B2 | 11/2013 | Chung |
| 8,584,307 B2 | 11/2013 | Won |
| 8,594,840 B1 | 11/2013 | Chiappetta |
| 8,598,829 B2 | 12/2013 | Landry |
| 8,599,645 B2 | 12/2013 | Chiappetta |
| 8,600,553 B2 | 12/2013 | Svendsen |
| 8,606,401 B2 | 12/2013 | Ozick |
| 8,634,956 B1 | 1/2014 | Chiappetta |
| 8,634,958 B1 | 1/2014 | Chiappetta |
| 8,666,523 B2 | 3/2014 | Kim |
| 8,671,513 B2 | 3/2014 | Yoo et al. |
| 8,732,895 B2 | 5/2014 | Cunningham |
| 8,741,013 B2 | 6/2014 | Swett et al. |
| 8,743,286 B2 | 6/2014 | Hasegawa |
| 8,745,194 B2 | 6/2014 | Uribe-Etxebarria Jimenez |
| 8,755,936 B2 | 6/2014 | Friedman |
| 8,761,931 B2 | 6/2014 | Halloran |
| 8,763,200 B2 | 7/2014 | Kim |
| 8,774,970 B2 | 7/2014 | Knopow |
| 8,798,791 B2 | 8/2014 | Li |
| 8,798,792 B2 | 8/2014 | Park |
| 8,799,258 B2 | 8/2014 | Mule |
| 8,838,274 B2 | 9/2014 | Jones |
| 8,839,477 B2 | 9/2014 | Schnittman |
| 8,843,245 B2 | 9/2014 | Choe |
| 8,855,914 B1 | 10/2014 | Alexander |
| 8,874,264 B1 | 10/2014 | Chiappetta |
| 8,881,339 B2 | 11/2014 | Gilbert, Jr. et al. |
| 8,924,042 B2 | 12/2014 | Kim |
| 8,961,695 B2 | 2/2015 | Romanov |
| 8,985,127 B2 | 3/2015 | Konandreas |
| 8,996,172 B2 | 3/2015 | Shah et al. |
| 9,033,079 B2 | 5/2015 | Shin |
| 9,037,396 B2 | 5/2015 | Pack |
| 9,052,721 B1 * | 6/2015 | Dowdall .............. G05D 1/0272 |
| 9,144,361 B2 | 9/2015 | Landry |
| 9,360,300 B2 | 6/2016 | DiBernado |
| 9,687,132 B2 | 6/2017 | Schlischka |
| 10,045,675 B2 | 8/2018 | Haegermarck |
| 2001/0004719 A1 | 6/2001 | Sommer |
| 2001/0037163 A1 | 11/2001 | Allard |
| 2002/0016649 A1 | 2/2002 | Jones |
| 2002/0091466 A1 | 7/2002 | Song |
| 2002/0108635 A1 | 8/2002 | Marrero |
| 2002/0121288 A1 | 9/2002 | Marrero |
| 2002/0121561 A1 | 9/2002 | Marrero |
| 2002/0164932 A1 | 11/2002 | Kamimura |
| 2002/0174506 A1 | 11/2002 | Wallach |
| 2002/0185071 A1 | 12/2002 | Guo |
| 2002/0189871 A1 | 12/2002 | Won |
| 2003/0000034 A1 | 1/2003 | Welsh |
| 2003/0025472 A1 | 2/2003 | Jones |
| 2003/0030398 A1 | 2/2003 | Jacobs |
| 2003/0120972 A1 | 6/2003 | Matsushima |
| 2003/0159223 A1 | 8/2003 | Plankenhorn |
| 2003/0167000 A1 | 9/2003 | Mullick |
| 2003/0229421 A1 | 12/2003 | Chmura |
| 2004/0020000 A1 | 2/2004 | Jones |
| 2004/0031111 A1 | 2/2004 | Porchia |
| 2004/0031121 A1 | 2/2004 | Martin |
| 2004/0034952 A1 | 2/2004 | Ho |
| 2004/0049877 A1 | 3/2004 | Jones |
| 2004/0049878 A1 | 3/2004 | Thomas |
| 2004/0074038 A1 | 4/2004 | Im |
| 2004/0074039 A1 | 4/2004 | Kim |
| 2004/0098167 A1 | 5/2004 | Yi |
| 2004/0111184 A1 | 6/2004 | Chiappetta |
| 2004/0111827 A1 | 6/2004 | Im |
| 2004/0167667 A1 | 8/2004 | Goncalves |
| 2004/0181896 A1 | 9/2004 | Egawa |
| 2004/0182839 A1 | 9/2004 | Denney |
| 2004/0182840 A1 | 9/2004 | Denney |

(56) References Cited

U.S. PATENT DOCUMENTS

| | | |
|---|---|---|
| 2004/0185011 A1 | 9/2004 | Alexander |
| 2004/0187249 A1 | 9/2004 | Jones |
| 2004/0207355 A1 | 10/2004 | Jones |
| 2004/0208212 A1 | 10/2004 | Denney |
| 2004/0210343 A1 | 10/2004 | Kim |
| 2004/0220707 A1 | 11/2004 | Pallister |
| 2005/0010331 A1 | 1/2005 | Taylor |
| 2005/0015912 A1 | 1/2005 | Kim |
| 2005/0015915 A1 | 1/2005 | Thomas |
| 2005/0028315 A1 | 2/2005 | Thomas |
| 2005/0028316 A1 | 2/2005 | Thomas |
| 2005/0042151 A1 | 2/2005 | Alward |
| 2005/0065662 A1 | 3/2005 | Reindle |
| 2005/0085947 A1 | 4/2005 | Aldred |
| 2005/0088643 A1 | 4/2005 | Anderson |
| 2005/0156562 A1 | 7/2005 | Cohen |
| 2005/0166354 A1 | 8/2005 | Uehigashi |
| 2005/0191949 A1 | 9/2005 | Kamimura |
| 2005/0217061 A1 | 10/2005 | Reindle |
| 2005/0223514 A1 | 10/2005 | Stuchlik |
| 2005/0229340 A1 | 10/2005 | Sawalski |
| 2005/0230166 A1 | 10/2005 | Petersson |
| 2005/0234611 A1 | 10/2005 | Uehigashi |
| 2005/0251292 A1 | 11/2005 | Casey |
| 2005/0251457 A1 | 11/2005 | Kashiwagi |
| 2005/0251947 A1 | 11/2005 | Lee |
| 2005/0267629 A1 | 12/2005 | Petersson |
| 2005/0278888 A1 | 12/2005 | Reindle |
| 2005/0287038 A1 | 12/2005 | Dubrovsky |
| 2006/0006316 A1* | 1/2006 | Takenaka ............ G05D 1/0246 250/221 |
| 2006/0009879 A1 | 1/2006 | Lynch |
| 2006/0010799 A1 | 1/2006 | Bohm |
| 2006/0020369 A1 | 1/2006 | Taylor |
| 2006/0028306 A1 | 2/2006 | Hukuba |
| 2006/0032013 A1 | 2/2006 | Kim |
| 2006/0045981 A1 | 3/2006 | Tsushi |
| 2006/0076039 A1 | 4/2006 | Song et al. |
| 2006/0095158 A1 | 5/2006 | Lee |
| 2006/0136096 A1 | 6/2006 | Chiappetta |
| 2006/0144834 A1 | 7/2006 | Denney |
| 2006/0178777 A1 | 8/2006 | Park |
| 2006/0190133 A1 | 8/2006 | Konandreas |
| 2006/0190134 A1 | 8/2006 | Ziegler |
| 2006/0190146 A1 | 8/2006 | Morse |
| 2006/0195015 A1 | 8/2006 | Mullick |
| 2006/0200281 A1 | 9/2006 | Ziegler |
| 2006/0213025 A1 | 9/2006 | Sawalski |
| 2006/0235570 A1 | 10/2006 | Jung |
| 2006/0235585 A1 | 10/2006 | Tanaka |
| 2006/0236492 A1 | 10/2006 | Sudo |
| 2006/0288519 A1 | 12/2006 | Jaworski |
| 2006/0293788 A1 | 12/2006 | Pogodin |
| 2007/0016328 A1 | 1/2007 | Ziegler |
| 2007/0021867 A1 | 1/2007 | Woo |
| 2007/0059441 A1 | 3/2007 | Greer |
| 2007/0061040 A1 | 3/2007 | Augenbraun et al. |
| 2007/0114975 A1 | 5/2007 | Cohen |
| 2007/0118248 A1* | 5/2007 | Lee ..................... G05D 1/0225 700/245 |
| 2007/0124890 A1 | 6/2007 | Erko |
| 2007/0143950 A1 | 6/2007 | Lin |
| 2007/0156286 A1 | 7/2007 | Yamauchi |
| 2007/0179670 A1 | 8/2007 | Chiappetta |
| 2007/0189347 A1 | 8/2007 | Denney |
| 2007/0204426 A1 | 9/2007 | Nakagawa |
| 2007/0213892 A1 | 9/2007 | Jones |
| 2007/0214601 A1 | 9/2007 | Chung |
| 2007/0234492 A1 | 10/2007 | Svendsen |
| 2007/0244610 A1 | 10/2007 | Ozick |
| 2007/0266508 A1 | 11/2007 | Jones |
| 2007/0267230 A1 | 11/2007 | Won |
| 2007/0267570 A1 | 11/2007 | Park |
| 2007/0267998 A1 | 11/2007 | Cohen |
| 2007/0273864 A1 | 11/2007 | Cho |
| 2007/0276541 A1 | 11/2007 | Sawasaki |
| 2007/0285041 A1 | 12/2007 | Jones |
| 2007/0289267 A1 | 12/2007 | Makarov |
| 2007/0290649 A1 | 12/2007 | Jones |
| 2008/0000041 A1 | 1/2008 | Jones |
| 2008/0000042 A1 | 1/2008 | Jones |
| 2008/0001566 A1 | 1/2008 | Jones |
| 2008/0007203 A1 | 1/2008 | Cohen |
| 2008/0009964 A1* | 1/2008 | Bruemmer ............ G05D 1/0088 700/245 |
| 2008/0015738 A1 | 1/2008 | Casey |
| 2008/0016631 A1 | 1/2008 | Casey |
| 2008/0037170 A1 | 2/2008 | Saliba |
| 2008/0039974 A1 | 2/2008 | Sandin |
| 2008/0047092 A1 | 2/2008 | Schnittman |
| 2008/0051953 A1 | 2/2008 | Jones |
| 2008/0007193 A1 | 3/2008 | Bow |
| 2008/0052846 A1 | 3/2008 | Kapoor |
| 2008/0058987 A1 | 3/2008 | Ozick |
| 2008/0063400 A1 | 3/2008 | Hudson |
| 2008/0065265 A1 | 3/2008 | Ozick |
| 2008/0077278 A1 | 3/2008 | Park |
| 2008/0084174 A1 | 4/2008 | Jones |
| 2008/0086241 A1 | 4/2008 | Phillips |
| 2008/0091304 A1 | 4/2008 | Ozick |
| 2008/0091305 A1 | 4/2008 | Svendsen |
| 2008/0093131 A1 | 4/2008 | Couture |
| 2008/0098553 A1 | 5/2008 | Dayton |
| 2008/0105445 A1 | 5/2008 | Dayton |
| 2008/0109126 A1 | 5/2008 | Sandin |
| 2008/0121097 A1 | 5/2008 | Rudakevych |
| 2008/0127445 A1 | 6/2008 | Konandreas |
| 2008/0127446 A1 | 6/2008 | Ziegler |
| 2008/0133052 A1 | 6/2008 | Jones |
| 2008/0134457 A1 | 6/2008 | Morse |
| 2008/0134458 A1 | 6/2008 | Ziegler |
| 2008/0140255 A1 | 6/2008 | Ziegler |
| 2008/0143063 A1 | 6/2008 | Won |
| 2008/0143064 A1 | 6/2008 | Won |
| 2008/0143065 A1 | 6/2008 | DeFazio |
| 2008/0152871 A1 | 6/2008 | Greer |
| 2008/0155768 A1 | 7/2008 | Ziegler |
| 2008/0179115 A1 | 7/2008 | Ohm |
| 2008/0183332 A1 | 7/2008 | Ohm |
| 2008/0184518 A1 | 8/2008 | Taylor |
| 2008/0196946 A1 | 8/2008 | Filippov |
| 2008/0205194 A1 | 8/2008 | Chiappetta |
| 2008/0209665 A1 | 9/2008 | Mangiardi |
| 2008/0221729 A1 | 9/2008 | Lavarec |
| 2008/0223630 A1 | 9/2008 | Couture |
| 2008/0235897 A1 | 10/2008 | Kim |
| 2008/0236907 A1 | 10/2008 | Won |
| 2008/0264456 A1 | 10/2008 | Lynch |
| 2008/0266254 A1 | 10/2008 | Robbins |
| 2008/0276407 A1 | 11/2008 | Schnittman |
| 2008/0276408 A1 | 11/2008 | Gilbert |
| 2008/0281470 A1 | 11/2008 | Gilbert |
| 2008/0282494 A1 | 11/2008 | Won |
| 2008/0294288 A1 | 11/2008 | Yamauchi |
| 2008/0307590 A1 | 12/2008 | Jones |
| 2009/0007366 A1 | 1/2009 | Svendsen |
| 2009/0025155 A1 | 1/2009 | Nishiyama |
| 2009/0030551 A1* | 1/2009 | Hein ..................... G05D 1/024 700/253 |
| 2009/0037024 A1 | 2/2009 | Jamieson |
| 2009/0038089 A1 | 2/2009 | Landry |
| 2009/0044370 A1 | 2/2009 | Won |
| 2009/0045766 A1 | 2/2009 | Casey |
| 2009/0055022 A1 | 2/2009 | Casey |
| 2009/0065271 A1 | 3/2009 | Won |
| 2009/0070946 A1 | 3/2009 | Tamada |
| 2009/0078035 A1 | 3/2009 | Mecca |
| 2009/0107738 A1 | 4/2009 | Won |
| 2009/0125175 A1 | 5/2009 | Park |
| 2009/0126143 A1 | 5/2009 | Haegermarck |
| 2009/0133720 A1 | 5/2009 | Vandenbogert |
| 2009/0145671 A1 | 6/2009 | Filippov |
| 2009/0173553 A1 | 7/2009 | Won |
| 2009/0180668 A1 | 7/2009 | Jones |

(56) References Cited

U.S. PATENT DOCUMENTS

| | | |
|---|---|---|
| 2009/0226113 A1 | 9/2009 | Matsumoto et al. |
| 2009/0232506 A1 | 9/2009 | Hudson |
| 2009/0241826 A1 | 10/2009 | Vosburgh |
| 2009/0254217 A1 | 10/2009 | Pack |
| 2009/0254218 A1 | 10/2009 | Sandin |
| 2009/0265036 A1 | 10/2009 | Jamieson |
| 2009/0270015 A1 | 10/2009 | DAmbra |
| 2009/0274602 A1 | 11/2009 | Alward |
| 2009/0281661 A1 | 11/2009 | Dooley et al. |
| 2009/0292393 A1 | 11/2009 | Casey |
| 2009/0292884 A1 | 11/2009 | Wang |
| 2009/0314318 A1 | 12/2009 | Chang |
| 2009/0314554 A1 | 12/2009 | Couture |
| 2009/0319083 A1 | 12/2009 | Jones |
| 2010/0001478 A1 | 1/2010 | DeFazio |
| 2010/0011529 A1 | 1/2010 | Won |
| 2010/0037418 A1 | 2/2010 | Hussey |
| 2010/0049364 A1 | 2/2010 | Landry |
| 2010/0049365 A1 | 2/2010 | Jones |
| 2010/0049391 A1 | 2/2010 | Nakano |
| 2010/0063628 A1 | 3/2010 | Landry |
| 2010/0075054 A1 | 3/2010 | Kaneyama |
| 2010/0076600 A1 | 3/2010 | Cross |
| 2010/0078415 A1 | 4/2010 | Denney |
| 2010/0082193 A1 | 4/2010 | Chiappetta |
| 2010/0107355 A1 | 5/2010 | Won |
| 2010/0108098 A1 | 5/2010 | Splinter |
| 2010/0115716 A1 | 5/2010 | Landry |
| 2010/0116566 A1 | 5/2010 | Ohm |
| 2010/0125968 A1 | 5/2010 | Ho |
| 2010/0139029 A1 | 6/2010 | Kim |
| 2010/0139995 A1 | 6/2010 | Rudakevych |
| 2010/0161225 A1 | 6/2010 | Hyung et al. |
| 2010/0173070 A1 | 7/2010 | Niu |
| 2010/0206336 A1 | 8/2010 | Souid |
| 2010/0217436 A1 | 8/2010 | Jones |
| 2010/0257690 A1 | 10/2010 | Jones |
| 2010/0257691 A1 | 10/2010 | Jones |
| 2010/0263142 A1 | 10/2010 | Jones |
| 2010/0263158 A1 | 10/2010 | Jones |
| 2010/0268384 A1 | 10/2010 | Jones |
| 2010/0275405 A1 | 11/2010 | Morse |
| 2010/0286791 A1 | 11/2010 | Goldsmith |
| 2010/0305752 A1* | 12/2010 | Abramson ............... G01S 1/70 700/245 |
| 2010/0312429 A1 | 12/2010 | Jones |
| 2010/0313910 A1 | 12/2010 | Lee |
| 2010/0313912 A1 | 12/2010 | Han |
| 2011/0000363 A1 | 1/2011 | More |
| 2011/0004339 A1 | 1/2011 | Ozick |
| 2011/0010873 A1 | 1/2011 | Kim |
| 2011/0077802 A1 | 3/2011 | Halloran |
| 2011/0082668 A1 | 4/2011 | Escrig |
| 2011/0088609 A1 | 4/2011 | Vosburgh |
| 2011/0109549 A1 | 5/2011 | Robbins |
| 2011/0125323 A1* | 5/2011 | Gutmann ............ G05D 1/0234 700/258 |
| 2011/0131741 A1 | 6/2011 | Jones |
| 2011/0154589 A1 | 6/2011 | Reindle |
| 2011/0202175 A1 | 8/2011 | Romanov |
| 2011/0209726 A1 | 9/2011 | Dayton |
| 2011/0252594 A1 | 10/2011 | Blouin |
| 2011/0258789 A1 | 10/2011 | Lavabre |
| 2011/0271469 A1 | 11/2011 | Ziegler |
| 2011/0277269 A1 | 11/2011 | Kim |
| 2011/0286886 A1 | 11/2011 | Luchinger |
| 2011/0288684 A1 | 11/2011 | Farlow |
| 2012/0011668 A1 | 1/2012 | Schnittman |
| 2012/0011669 A1 | 1/2012 | Schnittman |
| 2012/0011676 A1 | 1/2012 | Jung |
| 2012/0011677 A1 | 1/2012 | Jung |
| 2012/0011992 A1 | 1/2012 | Rudakevych |
| 2012/0036659 A1 | 2/2012 | Ziegler |
| 2012/0047676 A1 | 3/2012 | Jung |
| 2012/0049798 A1 | 3/2012 | Cohen |
| 2012/0079670 A1 | 4/2012 | Yoon |
| 2012/0083924 A1 | 4/2012 | Jones |
| 2012/0084934 A1 | 4/2012 | Li |
| 2012/0084937 A1 | 4/2012 | Won |
| 2012/0084938 A1 | 4/2012 | Fu |
| 2012/0085368 A1 | 4/2012 | Landry |
| 2012/0090133 A1 | 4/2012 | Kim |
| 2012/0095619 A1 | 4/2012 | Pack |
| 2012/0096656 A1 | 4/2012 | Jung |
| 2012/0097783 A1 | 4/2012 | Pack |
| 2012/0101661 A1 | 4/2012 | Phillips |
| 2012/0102670 A1 | 5/2012 | Jang |
| 2012/0106829 A1 | 5/2012 | Lee et al. |
| 2012/0109423 A1 | 5/2012 | Pack |
| 2012/0110755 A1 | 5/2012 | Liu |
| 2012/0118216 A1 | 5/2012 | Vosburgh |
| 2012/0125363 A1 | 5/2012 | Kim |
| 2012/0137464 A1 | 6/2012 | Thatcher |
| 2012/0137949 A1 | 6/2012 | Vosburgh |
| 2012/0151709 A1 | 6/2012 | Tang |
| 2012/0152280 A1 | 6/2012 | Bosses |
| 2012/0152877 A1 | 6/2012 | Tadayon |
| 2012/0159725 A1 | 6/2012 | Kapoor |
| 2012/0166024 A1 | 6/2012 | Phillips |
| 2012/0167917 A1 | 7/2012 | Gilbert |
| 2012/0169497 A1 | 7/2012 | Schnittman |
| 2012/0173018 A1 | 7/2012 | Allen |
| 2012/0173070 A1 | 7/2012 | Schnittman |
| 2012/0180254 A1 | 7/2012 | Morse |
| 2012/0180712 A1 | 7/2012 | Vosburgh |
| 2012/0181099 A1 | 7/2012 | Moon |
| 2012/0182392 A1 | 7/2012 | Kearns |
| 2012/0183382 A1 | 7/2012 | Couture |
| 2012/0185091 A1 | 7/2012 | Field |
| 2012/0185094 A1 | 7/2012 | Rosenstein |
| 2012/0185095 A1 | 7/2012 | Rosenstein |
| 2012/0185096 A1 | 7/2012 | Rosenstein |
| 2012/0192898 A1 | 8/2012 | Lynch |
| 2012/0194395 A1 | 8/2012 | Williams |
| 2012/0197439 A1 | 8/2012 | Wang |
| 2012/0197464 A1 | 8/2012 | Wang |
| 2012/0199006 A1 | 8/2012 | Swett |
| 2012/0199407 A1 | 8/2012 | Morey |
| 2012/0200149 A1 | 8/2012 | Rudakevych |
| 2012/0222224 A1 | 9/2012 | Yoon |
| 2012/0246862 A1 | 10/2012 | Landry |
| 2012/0260443 A1 | 10/2012 | Lindgren |
| 2012/0260861 A1 | 10/2012 | Lindgren |
| 2012/0261204 A1 | 10/2012 | Won |
| 2012/0265346 A1 | 10/2012 | Gilbert |
| 2012/0265391 A1 | 10/2012 | Letsky |
| 2012/0268587 A1 | 10/2012 | Robbins |
| 2012/0281829 A1 | 11/2012 | Rudakevych |
| 2012/0298029 A1 | 11/2012 | Vosburgh |
| 2012/0303160 A1 | 11/2012 | Ziegler |
| 2012/0311810 A1 | 12/2012 | Gilbert |
| 2012/0312221 A1 | 12/2012 | Vosburgh |
| 2012/0317745 A1 | 12/2012 | Jung |
| 2012/0322349 A1 | 12/2012 | Josi |
| 2013/0015596 A1 | 1/2013 | Mozeika |
| 2013/0025085 A1 | 1/2013 | Kim |
| 2013/0031734 A1 | 2/2013 | Porat |
| 2013/0032078 A1 | 2/2013 | Yahnker |
| 2013/0035793 A1 | 2/2013 | Neumann |
| 2013/0047368 A1 | 2/2013 | Tran |
| 2013/0054029 A1 | 2/2013 | Huang |
| 2013/0054129 A1 | 2/2013 | Wong |
| 2013/0060357 A1 | 3/2013 | Li |
| 2013/0060379 A1 | 3/2013 | Choe |
| 2013/0070563 A1 | 3/2013 | Chiappetta |
| 2013/0081218 A1 | 4/2013 | Kim |
| 2013/0085603 A1 | 4/2013 | Chiappetta |
| 2013/0086760 A1 | 4/2013 | Han |
| 2013/0092190 A1 | 4/2013 | Yoon |
| 2013/0098402 A1 | 4/2013 | Yoon et al. |
| 2013/0103194 A1 | 4/2013 | Jones |
| 2013/0105233 A1 | 5/2013 | Couture |
| 2013/0117952 A1 | 5/2013 | Schnittman |
| 2013/0118524 A1 | 5/2013 | Konandreas |

(56) References Cited

U.S. PATENT DOCUMENTS

| | | |
|---|---|---|
| 2013/0138337 A1 | 5/2013 | Pack |
| 2013/0145572 A1 | 6/2013 | Schregardus |
| 2013/0152724 A1 | 6/2013 | Mozeika |
| 2013/0160226 A1 | 6/2013 | Lee |
| 2013/0166107 A1 | 6/2013 | Robbins |
| 2013/0174371 A1 | 7/2013 | Jones |
| 2013/0204463 A1 | 8/2013 | Chiappetta |
| 2013/0204465 A1 | 8/2013 | Phillips |
| 2013/0204483 A1 | 8/2013 | Sung |
| 2013/0205520 A1 | 8/2013 | Kapoor |
| 2013/0206170 A1 | 8/2013 | Svendsen |
| 2013/0206177 A1 | 8/2013 | Burlutskiy |
| 2013/0211589 A1 | 8/2013 | Landry |
| 2013/0214498 A1 | 8/2013 | DeFazio |
| 2013/0226344 A1 | 8/2013 | Wong |
| 2013/0227801 A1 | 9/2013 | Kim |
| 2013/0227812 A1 | 9/2013 | Kim |
| 2013/0228198 A1 | 9/2013 | Hung et al. |
| 2013/0228199 A1 | 9/2013 | Hung |
| 2013/0231779 A1 | 9/2013 | Purkayastha |
| 2013/0231819 A1 | 9/2013 | Hung |
| 2013/0232702 A1 | 9/2013 | Baek |
| 2013/0239870 A1 | 9/2013 | Hudson |
| 2013/0241217 A1 | 9/2013 | Hickey |
| 2013/0253701 A1 | 9/2013 | Halloran |
| 2013/0256042 A1 | 10/2013 | Rudakevych |
| 2013/0268118 A1 | 10/2013 | Grinstead |
| 2013/0269148 A1 | 10/2013 | Chiu |
| 2013/0273252 A1 | 10/2013 | Miyamoto |
| 2013/0298350 A1 | 11/2013 | Schnittman |
| 2013/0310978 A1 | 11/2013 | Ozick |
| 2013/0325178 A1 | 12/2013 | Jones |
| 2013/0331987 A1 | 12/2013 | Karlsson |
| 2013/0338525 A1 | 12/2013 | Allen |
| 2013/0338828 A1 | 12/2013 | Chiappetta |
| 2013/0338831 A1 | 12/2013 | Noh et al. |
| 2013/0340201 A1 | 12/2013 | Jang et al. |
| 2014/0016469 A1 | 1/2014 | Ho |
| 2014/0026339 A1 | 1/2014 | Konandreas |
| 2014/0053351 A1 | 2/2014 | Kapoor |
| 2014/0109339 A1 | 4/2014 | Won |
| 2014/0123325 A1 | 5/2014 | Jung |
| 2014/0130272 A1 | 5/2014 | Won |
| 2014/0142757 A1 | 5/2014 | Ziegler |
| 2014/0167931 A1 | 6/2014 | Lee |
| 2014/0180968 A1 | 6/2014 | Song |
| 2014/0207280 A1 | 7/2014 | Duffley |
| 2014/0207281 A1 | 7/2014 | Angle |
| 2014/0207282 A1 | 7/2014 | Angle |
| 2014/0238440 A1 | 8/2014 | Dayton |
| 2014/0249671 A1 | 9/2014 | Halloran |
| 2014/0283326 A1 | 9/2014 | Song |
| 2015/0005937 A1 | 1/2015 | Ponulak |
| 2015/0032259 A1 | 1/2015 | Kim et al. |
| 2015/0039127 A1 | 2/2015 | Matsumoto |
| 2015/0057800 A1 | 2/2015 | Cohen |
| 2015/0120056 A1 | 4/2015 | Noh et al. |
| 2015/0185322 A1 | 7/2015 | Haegermarck |
| 2015/0197012 A1 | 7/2015 | Schnittman |
| 2015/0206015 A1 | 7/2015 | Ramalingam et al. |
| 2015/0265122 A1 | 9/2015 | Han et al. |
| 2016/0202703 A1 | 7/2016 | Matsubara |
| 2016/0306359 A1 | 10/2016 | Lindhe |
| 2016/0316982 A1 | 11/2016 | Kim et al. |
| 2017/0273521 A1 | 9/2017 | Klintemyr et al. |
| 2017/0273524 A1 | 9/2017 | Klintemyr et al. |
| 2018/0103812 A1 | 4/2018 | Lee et al. |

FOREIGN PATENT DOCUMENTS

| | | |
|---|---|---|
| CN | 1668238 A | 9/2005 |
| CN | 101161174 A | 4/2008 |
| CN | 101297267 A | 10/2008 |
| CN | 102083352 A | 6/2011 |
| CN | 102506748 A | 6/2012 |
| CN | 103027634 | 4/2013 |
| CN | 103054516 A | 4/2013 |
| CN | 103491838 A | 1/2014 |
| CN | 103565373 A | 2/2014 |
| DE | 3536907 | 4/1986 |
| DE | 9307500 | 7/1993 |
| DE | 4211789 | 10/1993 |
| DE | 4340367 | 6/1995 |
| DE | 4439427 A1 | 5/1996 |
| DE | 19849978 | 5/2000 |
| DE | 202008017137 U1 | 3/2009 |
| DE | 102010000174 | 7/2011 |
| DE | 102010000573 | 9/2011 |
| DE | 102010037672 | 3/2012 |
| EP | 0142594 | 5/1985 |
| EP | 0358628 | 3/1990 |
| EP | 0474542 | 3/1992 |
| EP | 0569984 | 11/1993 |
| EP | 0606173 | 7/1994 |
| EP | 1099143 | 11/2003 |
| EP | 1360922 A2 | 11/2003 |
| EP | 1441271 | 7/2004 |
| EP | 1331537 | 8/2005 |
| EP | 2050380 | 4/2009 |
| EP | 1969438 | 9/2009 |
| EP | 1395888 | 5/2011 |
| EP | 2316322 | 5/2011 |
| EP | 2296005 | 6/2011 |
| EP | 2251757 | 11/2011 |
| EP | 2417894 | 2/2012 |
| EP | 2438843 | 4/2012 |
| EP | 2466411 A2 | 6/2012 |
| EP | 2561787 | 2/2013 |
| EP | 2578125 | 4/2013 |
| EP | 2583609 | 4/2013 |
| EP | 2604163 | 6/2013 |
| EP | 2447800 | 4/2014 |
| EP | 2741483 | 6/2014 |
| EP | 2772815 | 9/2014 |
| EP | 2884364 A1 | 6/2015 |
| EP | 2992803 A1 | 3/2016 |
| FR | 2999410 | 6/2014 |
| GB | 2355523 | 4/2001 |
| GB | 2382251 | 5/2003 |
| GB | 2494446 | 3/2013 |
| GB | 1447943 | 10/2013 |
| JP | 5540959 | 3/1980 |
| JP | 6286414 | 4/1987 |
| JP | 62109528 | 5/1987 |
| JP | 62120510 | 6/1987 |
| JP | 62152421 | 7/1987 |
| JP | 62152424 | 7/1987 |
| JP | 63127310 A | 5/1988 |
| JP | 63181727 | 7/1988 |
| JP | 63241610 | 10/1988 |
| JP | 03162814 A | 7/1991 |
| JP | 03166074 | 7/1991 |
| JP | 04260905 | 9/1992 |
| JP | 0584200 | 4/1993 |
| JP | 0584210 | 4/1993 |
| JP | 05084200 | 4/1993 |
| JP | 05189041 | 7/1993 |
| JP | 05224745 | 9/1993 |
| JP | 05228090 | 9/1993 |
| JP | 064133 | 1/1994 |
| JP | 0683442 A | 3/1994 |
| JP | 06125861 | 5/1994 |
| JP | 06144215 | 5/1994 |
| JP | 06179145 | 6/1994 |
| JP | 075922 | 1/1995 |
| JP | 0759695 | 3/1995 |
| JP | 0732752 B2 | 4/1995 |
| JP | 07129239 A | 5/1995 |
| JP | 07281742 | 10/1995 |
| JP | 08089455 | 4/1996 |
| JP | 08326025 | 12/1996 |
| JP | 0944240 | 2/1997 |
| JP | 09150741 | 6/1997 |
| JP | 09185410 | 7/1997 |

(56) References Cited

FOREIGN PATENT DOCUMENTS

| | | |
|---|---|---|
| JP | 11267074 | 10/1999 |
| JP | 2001022443 | 1/2001 |
| JP | 2001187009 | 7/2001 |
| JP | 2002182742 A | 6/2002 |
| JP | 2002287824 A | 10/2002 |
| JP | 2002355204 | 12/2002 |
| JP | 2002366228 | 12/2002 |
| JP | 2003280740 | 10/2003 |
| JP | 2004096253 | 3/2004 |
| JP | 2004166968 | 6/2004 |
| JP | 2004198212 | 7/2004 |
| JP | 2004303134 A | 10/2004 |
| JP | 2005040597 A | 2/2005 |
| JP | 2005124753 A | 5/2005 |
| JP | 2005141636 A | 6/2005 |
| JP | 2005314116 A | 11/2005 |
| JP | 2006015113 A | 1/2006 |
| JP | 2006087507 | 4/2006 |
| JP | 2006185438 A | 7/2006 |
| JP | 2006231477 | 9/2006 |
| JP | 2006314669 | 11/2006 |
| JP | 2007014369 A | 1/2007 |
| JP | 2007070658 | 3/2007 |
| JP | 2007143645 A | 6/2007 |
| JP | 2007213236 A | 8/2007 |
| JP | 2007226322 A | 9/2007 |
| JP | 2007272665 A | 10/2007 |
| JP | 2008132299 A | 6/2008 |
| JP | 2008146617 A | 6/2008 |
| JP | 2008290184 | 12/2008 |
| JP | 2008543394 A | 12/2008 |
| JP | 2009509220 | 3/2009 |
| JP | 2009193240 A | 8/2009 |
| JP | 2010507169 A | 3/2010 |
| JP | 2010079869 A | 4/2010 |
| JP | 2010526594 | 8/2010 |
| JP | 2010534825 A | 11/2010 |
| JP | 2011045694 | 3/2011 |
| JP | 2011253361 A | 12/2011 |
| JP | 2012210051 A | 11/2012 |
| JP | 2013041506 A | 2/2013 |
| JP | 2013041506 A * | 2/2013 |
| JP | 101231932 | 3/2013 |
| JP | 2013089256 A | 5/2013 |
| JP | 2014023930 A | 2/2014 |
| KR | 20040096253 | 11/2004 |
| KR | 20050003112 | 1/2005 |
| KR | 20070070658 | 7/2007 |
| KR | 20090028359 | 3/2009 |
| KR | 20120047137 A | 5/2012 |
| NL | 7408667 | 1/1975 |
| WO | 8804081 | 6/1988 |
| WO | 9303399 | 2/1993 |
| WO | 9638770 | 12/1996 |
| WO | 0036961 | 6/2000 |
| WO | 0036970 | 6/2000 |
| WO | 0038025 | 6/2000 |
| WO | 0182766 A2 | 11/2001 |
| WO | 03022120 | 3/2003 |
| WO | 03024292 | 3/2003 |
| WO | 03026474 A2 | 4/2003 |
| WO | 2004006034 A2 | 1/2004 |
| WO | 2004082899 | 9/2004 |
| WO | 2007008148 | 1/2007 |
| WO | 2007028049 | 3/2007 |
| WO | 2007051972 | 5/2007 |
| WO | 2007065034 | 6/2007 |
| WO | 2008048260 | 4/2008 |
| WO | 2009132317 | 10/2009 |
| WO | 2013105431 | 7/2013 |
| WO | 2013157324 | 10/2013 |
| WO | 2014033055 | 3/2014 |
| WO | 2014151501 A1 | 9/2014 |
| WO | 2015016580 | 2/2015 |

OTHER PUBLICATIONS

AMOS.pdf (Jens-Steffen Gutmann, Christian Schlegel, AMOS: Comparison of Scan Matching Approaches for Self-Localization in Indoor Environments, 1996, IEEE, pp. 61-67) (Year: 1996).*
Final Office Action for U.S. Appl. No. 15/102,017, dated Jun. 14, 2018, 12 pages.
Non Final Office Action for U.S. Appl. 15/101,235, dated Jun. 14, 2018, 11 pages.
Chinese Office Action for Chinese Application No. 201380081331.6, dated Mar. 26, 2018 with translation, 27 pages.
Decision of Refusal for Japanese Application No. 2016-526945, dated May 15, 2018 with translation, 5 pages.
Decision of Refusal for Japanese Application No. 2016-526875, dated May 15, 2018 with translation, 6 pages.
Notification of Reasons for Refusal for Japanese Application No. 2016-526765, dated May 15, 2018 with translation, 6 pages.
International Search Report and Written Opinion for International Application No. PCT/EP2015/070140, dated May 27, 2016, 11 pages.
European Communication Pursuant to Article 94(3) for European Application No. 13817911.4, dated Jan. 15, 2018, 8 pages.
Non Final Office Action for U.S. Appl. No. 15/102,017, dated Feb. 16, 2018, 12 pages.
Notice of Allowance for U.S. Appl. No. 15/101,257, dated Jul. 6, 2017, 9 pages.
International Search Report and Written Opinion of the International Searching Authority for International Application No. PCT/EP2015/058377, dated Aug. 10, 2016, 15 pages.
Non Final Office Action for U.S. Appl. No. 15/102,015, dated Aug. 17, 2017, 13 pages.
Non Final Office Action for U.S. Appl. No. 15/101,212, dated May 17, 2017, 8 pages.
Japanese Office Action for Application for Japanese Application No. 2015-528969, dated Apr. 7, 2017 with translation, 4 pages.
Final Office Action for U.S. Appl. No. 14/409,291, dated Jun. 6, 2017, 21 pages.
Non Final Office Action for U.S. Appl. No. 15/101,515, dated Apr. 18, 2018, 14 pages.
Notice of Allowance for U.S. Appl. No. 15/101,212, dated Apr. 11, 2018, 9 pages.
Final Office Action for U.S. Appl. No. 14/784,106, dated Mar. 28, 2018, 8 pages.
Final Office Action for U.S. Appl. No. 15/100,667, dated Mar. 27, 2018, 22 pages.
Notification of Reasons for Refusal for Japanese Application No. 2017-501374, dated Mar. 6, 2018 with translation, 8 pages.
Chinese Office Action for Chinese Application No. 201380081535.X, dated Mar. 26, 2018 with translation, 18 pages.
Chinese Office Action for Chinese Application No. 201380081103.9, dated Feb. 27, 2018 with translation, 19 pages.
Non Final Office Action for U.S. Appl. No. 15/101,235, dated Nov. 1, 2017, 11 pages.
Non Final Office Action for U.S. Appl. No. 15/100,667, dated Nov. 29, 2017, 22 pages.
Non Final Office Action for U.S. Appl. No. 14/784,106, dated Oct. 19, 2017, 11 pages.
Final Office Action for U.S. Appl. No. 15/101,212, dated Oct. 11, 2017, 7 pages.
Chinese Office Action for Chinese Application No. 201380075510.9, dated Oct. 27, 2017 with translation, 13 pages.
Notification of Reasons for Refusal for Japanese Application No. 2016-526945, dated Oct. 31, 2017 with translation, 8 pages.
Notification of Reasons for Refusal for Japanese Application No. 2016-526875, dated Oct. 31, 2017 with translation, 10 pages.
Notice of Reasons for Rejection for Japanese Application No. 2016-526947, dated Sep. 21, 2017 with translation, 8 pages.
Notice of Allowance for U.S. Appl. No. 15/102,015, dated Dec. 11, 2017, 8 pages.
Chinese Office Action for Chinese Application No. 201380075503.9, dated Nov. 8, 2017 with translation, 16 pages.

(56) References Cited

OTHER PUBLICATIONS

European Communication Pursuant to Article 94(3) for European Application No. 16176479.0, dated Nov. 27, 2017, 6 pages.
Notice of Allowance for U.S. Appl. No. 14/409,291, dated Sep. 18, 2017. 8 pages.
Notice of Reasons for Rejection for Japanese Application No. 2016-526764, dated Aug. 25, 2017 with translation, 6 pages.
Notification of Reasons for Rejection for Japanese Application No. 2016-526765, dated Aug. 25, 2017 with translation, 7 pages.
Notification of Reasons for Refusal for Japanese Application No. 2016-526756, dated Aug. 10, 2017 with translation, 6 pages.
Notification of Reasons for Refusal for Japanese Application No. 2016-526759, dated Aug. 24, 2017 with translation, 9 pages.
"SM51 Series Opposed Mode Sensors, DC sensors with metal housings: SM51EB/RB, SM51EB6/RB6", Banner Engineering Corporation, pp. 1-24.
Andersson, et al., "ISR: An Intelligent Service Robot", Centre for Autonomous Systems, Royal Institute of Technology, S-100 44 Stockholm, Sweden, pp. 1-24.
Berlin, et al. "Development of a Multipurpose Mobile Robot for Concrete Surface Processing", A Status Report, Feb. 1992, Sweden, pp. 1-10.
Borenstein, et al. "Real-Time Obstacle Avoidance for Fast Mobile Robots", IEEE, Jan. 6, 1996, pp. 1-18.
Braunstingl, et al., "Fuzzy Logic Wall Following of a Mobile Robot Based on the Concept of General Perception", ICAR '95, 7th International Conference on Advanced Robotics, Sant Feliu De Guixols, Spain pp. 367-376., Sep. 1995, pp. 1-9.
Caselli, et al. "Mobile Robot Navigation in Enclosed Large-Scale Space", Italy and U.S.A., pp. 1-5.
Cassens, et al. "Finishing and Maintaining Wood Floors", Wood Finishing, North Central Regional Extension Publication #136, pp. 1-8.
Chinese Office Action for Chinese Application No. 20130075510.9, dated Feb. 6, 2017 with translation, 14pages.
Chinese Office Action for Chinese Application No. 201380075503.9, dated Feb. 13, 2017 with translation, 18 pages.
Chung etal.,"Path Planning for a Mobile Robot With Grid Type World Model", Proceedings of the 1992 IEEE/RSJ International Conference on Intelligent Robots and Systems,Jul. 7-10, 1992, pp. 439-444.
Collins, et al. "Cerebellar Control of a Line Following Robot", Computer Science and Electrical Engineering Department, University of Queensland, St.Lucia, Queensland, 4072 A, pp. 1-6.
Doty, et al. "Sweep Strategies for a Sensory-Driven, Behavior-Based Vacuum Cleaning Agent", 1993, Machine Intelligence Laboratory—Gainesville Florida, AAAI 1993 Fall Symposium Series-Research Triangle Park—Raleigh, NC, Oct. 22-24, 1993, pp. 1-6.
Everett, Sensors for Mobile Robots Theory and Application, A.K. Peters, 1995, Chapters 1 and 3, 70pages.
Everett, Sensors for Mobile Robots Theory and Application, A.K. Peters, Ltd., 1995, Chapters 15 and 16, 59pages.
Everett, Sensors for Mobile Robots Theory and Application, A.K. Peters, Ltd., 1995, Chapters 6, 7 and 10, 79pages.
Everett, Sensors for Mobile Robots Theory and Application, A.K. Peters, Ltd., 1995, Chapters, 4a nd 5, 68pages.
Everett, et al. "Survey of Collision Avoidance and Ranging Sensors for Mobile Robots", Revision 1, Technical Report 1194, Dec. 1992, pp. 1-154.
Extended European Search Report for European Application No. 16176479.0, dated Nov. 11, 2016, 9pages.
Final Office Action for U.S. Appl. No. 15/100,667, dated Apr. 21, 2017, 26 pages.
Gavrilut, et al., "Wall-Following Method for an Autonomous Mobile Robot using Two IR Sensors", 12th WSEAS International Conference on Systems, Heraklion, Greece, Jul. 22-24, 2008, ISBN: 978-960-6766-83-1, ISSN: 1790-2769, pp. 205-209.
Herbst, et al., "Micromouse Design Specifications", Jun. 2, 1998, pp. 1-22.

International Preliminary Report on Patentability for International Application No. PCT/EP2013/077377, dated Jun. 21, 2016, 12 pages.
International Preliminary Report on Patentability for International Application No. PCT/EP2013/077378, dated Jun. 21, 2016, 7 pages.
International Preliminary Report on Patentability for International Application No. PCT/EP2013/077384, dated Jun. 21, 2016, 6 pages.
International Preliminary Report on Patentability for International Application No. PCT/EP2013/077385, dated Jun. 21, 2016, 7 pages.
International Preliminary Report on Patentability for International Application No. PCT/EP2013/077386, dated Jun. 21, 2016, 6 pages.
International Preliminary Report on Patentability for International Application No. PCT/EP2013/077387, dated Jun. 21, 2016, 9 pages.
International Preliminary Report on Patentability for International Application No. PCT/EP2013/077657, dated Jun. 21, 2016, 7 pages.
International Preliminary Report on Patentability for International Application No. PCT/EP2013/077661, dated Jun. 21, 2016, 11 pages.
International Preliminary Report on Patentability for International Application No. PCT/EP203/077380, dated Jun. 21, 2016, 6 pages.
International Search Report and Written Opinion of the International Searching Authority fo rInternatonal Applicaion No. PCT/EP2014/0077142, dated Sep. 11, 2015, 8 pages.
International Search Report and Written Opinion of the International Searching Authority for International Application No. PCT/EP2014/069073, dated May 12, 2015, 10pages.
International Search Report and Written Opinion of the International Searching Authority for International Application No. PCT/Ep2012/077377, dated Nov. 6, 2014, 18 pages.
International Search Report and Written Opinion of the International Searching Authority for International Application No. PCT/EP2013/077378, dated Apr. 9, 2014, 9 pages.
International Search Report and Written Opinion of the International Searching Authority for International Application No. PCT/EP2013/077380, dated Jul. 28, 2014, 8 pages.
International Search Report and Written Opinion of the International Searching Authority for International Application No. PCT/EP2013/077384, dated Aug. 14, 2016, 9 pages.
International Search Report and Written Opinion of the International Searching Authority for International Application No. PCT/EP2013/077385, dated May 27, 2015, 9 pages.
International Search Report and Written Opinion of the International Searching Authority for International Application No. PCT/EP2013/077386, dated Sep. 17, 2014, 9 pages.
International Search Report and Written Opinion of the International Searching Authority for International Application No. PCT/EP2013/077387, dated Sep. 30, 2014, 12 pages.
International Search Report and Written Opinion of the International Searching Authority for International Application No. PCT/EP2013/077661, dated Jun. 10, 2014, 15 pages.
International Search Report and Written Opinion of the International Searching Authority for International Application No. PCT/EP2014/069074, dated May 11, 2015, 9 pages.
International Search Report and Written Opinion of the International Searching Authority for International Application No. PCT/EP2014/077549, dated Jul. 27, 2015, 9 pages.
International Search Report and Written Opinion of the International Searching Authority for International Application No. PCT/EP2014/077947, dated Jul. 11, 2016, 14 pages.
International Search Report and Written Opinion of the International Searching Authority for International Application No. PCT/EP2014/077954, dated Oct. 12, 2015, 19pages.
International Search Report and Written Opinion of the International Searching Authority for International Application No. PCT/EP2014/078144, 7 pages.
International Search Report and Written Opinion of the International Searching Authority for International Application No. PCT/EP32013/077657, dated Aug. 18, 2014, 10 pages.
International Search Report for International Application No. PCT/EP2013/057814 dated Dec. 20, 2013, 5pages.
International Search Report for International Application No. PCT/EP2013/057815 dated Apr. 2, 2014, 4 pages.

(56) References Cited

OTHER PUBLICATIONS

International Search Report for International Application No. PCT/EP2013/067500 dated Dec. 10, 2013, 4pages.
Japanese Office Action for Japanese Application No. 2016-506794, dated Feb. 7, 2017 with translation, 10 pages.
Japanese Office Action for Japanese Application No. 2016-506795, dated Feb. 7, 2017 with translation, 6 pages.
Jenkins, "Practical Requirements for a Domestic Vacuum-Cleaning Robot", From: AAAI Technical Report FS-93-03., JRL Consulting, Menlo Park, California, pp. 85-90.
Jones et al., Mobile Robots Inspiration to Implementation, Second Edition, A.K. Peters, Ltd., 1999, Chapters 1 and 5, 72pages.
Jones etal., Mobile Robots Inspiration to Implementation, Second Edition, A.K. Peters ,Ltd., 1999, Chapters 6 and 9, 56pages.
Jones etal., Mobile Robots Inspiration to Implementation, Second Edition, A.K. Peters, Ltd., 1999, Chapters 10 and 11, 45pages.
Jung, et al. "Whisker Based Mobile Robot Navigation", Wollongong, NSW 2500, Australia, pp. 1-8.
Krishna, et al., "Solving the Local Minima Problem for a Mobile Robot by Classification of Spatio-Temporal Sensory Sequences", Journal of Robotic Systems 17 (10), 2000, pp. 549-564.
Kube, "A Minimal Infrared Obstacle Detection Scheme", Department of Computing Science, University of Alberta, Edmonton, Alberta, Canada, The Robotics Practitioner, 2(2): 15-20, 1996, Oct. 23, 1998, pp. 1-8.
Larson, "RoboKent—a case study in man-machine interfaces" Industrial Robot, vol. 25 No. 2, 1998, pp. 95-100.
LeBouthillier, "W. Grey Walter and his Turtle Robots", The Robot Builder, vol. Eleven No. Five, May 1999, RSSC POB 26044, Santa Ana,CA, pp. 1-8.
Maaref,etal."Sensor-based navigation of a mobile robot in an indoor environment", Robotics and Autonomous Systems, 2002, Elsevier, 18pages.
Michael Carsten Bosse, "Atlas: A Framework for Large Scale Automated Mapping and Localization", Massachusetts Institute of Technology, Feb. 2004, Part 2, 67 pages.
Michael Carsten Bosse, "Atlas: A Framework for Large Scale Automated Mapping and Localization", Massachusetts Institute of Technology, Feb. 2004, Part 1, 140 pages.
Non Final Office Action for U.S. Appl. No. 14/409,291, dated Dec. 28, 2016, 61pages.
Non Final Office Action for U.S. Appl. No. 15/100,667, dated Sep. 12, 2016, 24 pages.
Non Final Office Action for U.S. Appl. No. 15/101,235 dated Apr. 21, 2017, 10 pages.
Non Final Office Action for U.S. Appl. No. 15/101,257, dated Feb. 10, 2017, 10 pages.
Notice of Allowance for U.S. Appl. No. 14/409,291, dated Jun. 16, 2016, 13 pages.
Oren, Reply to Office Action dated Jun. 23, 2014, U.S. Appl. No. 13/757,985, pp. 1-10.
Pack, et al., "Constructing a Wall-Follower Robot for a Senior Design Project", 1996 ASEE Annual Conference Proceedings, Session 1532, pp. 1-7.
Saffiotti, "Fuzzy logic in Autonomous Robot Navigation", a case study, Nov. 1995 Revised: Aug. 1997, IRIDIA, Universite Libre de Bruxelles, Belgium, , Technical Report TR/IRIDIA/ 95 25, Cover page + pp. 1-14.
Written Opinion for International Application No. PCT/EP2013/067500 dated Dec. 10, 2013, 7pages.
Yamamoto, SOZZY: A Hormone-Driven Autonomous Vacuum Cleaner, From: AAAI Technical Report FS-93-03, Matasushita Research Institute, Tokyo, and MIT Artificial Intelligence laboratory, Massachusetts, pp. 116-124 + Figure 9 and Figure 11.
International Search Report and Written Opinion for International Application No. PCT/EP2016/055547, dated Jan. 2, 2017, 10 pages.
Notice of Allowance for U.S. Appl. No. 15/100,667,dated Aug. 6, 2018, 10 pages.
Non Final Office Action for U.S. Appl. No. 15/101,510, dated Jul. 27, 2018, 17 pages.
Non Final Office Action for U.S. Appl. No. 14/784,110, dated Aug. 16, 2018, 13 pages.
Chinese Office Action for Chinese Application No. 201380081537.9, dated Jun. 4, 2018 with translation, 15 pages.
Notice of Allowance for U.S. Appl. No. 14/784,106, dated Oct. 11, 2018, 7 pages.
Non Final Office Action for U.S. Appl. No. 15/504,071, dated Nov. 2, 2018, 17 pages.
Non Final Office Action for U.S. Appl. No. 15/504,066, dated Nov. 5, 2018, 18 pages.
International Search Report and Written Opinion of the International Searching Authority for International Application No. PCT/E2016/072291, dated Jun. 6, 2017, 11 pages.
Non Final Office Action for U.S. Appl. No. 15/102,017, dated Jan. 22, 2019, 15 pages.
Final Office Action for U.S. Appl. No. 15/101,510, dated Feb. 8, 2019, 16 pages.
Extended European Search Report for European Application No. 18157403.9, dated Nov. 14, 2018, 12 pages.
Report of Reconsideration by Examiner before Appeal for Japanese Application No. 2016-526875, dated Oct. 24, 2018, 2 pages.
Final Office Action for U.S. Appl. No. 15/101,235, dated Jan. 11, 2019, 12 pages.
Notice of Allowance for U.S. Appl. No. 15/102,295, dated Sep. 24, 2018, 9 pages.
Notice of Allowance for U.S. Appl. No. 15/101,515, dated Aug. 28, 2018, 11 pages.
International Search Report and Written Opinion of the International Searching Authority for International Application No. PCT/EP2016/060565, dated Feb. 15, 2017, 12 pages.
International Search Report and Written Opinion of the International Searching Authority for International Application No. PCT/EP2016/060571, dated Feb. 7, 2017, 8 pages.
Notification of Reasons for Refusal of Japanese Application No. 2016-568949, dated Oct. 9, 2018 with translation, 6 pages.
Chinese Office Action for Chinese Application No. 201380081535.X, dated Jun. 12, 2019 with translation, 25 pages.
Chinese Office Action for Chinese Application No. 201480079515.3, dated Jun. 5, 2019, 9 pages.
Non Final Office Action for U.S. Appl. No. 15/101,235 dated Sep. 6, 2019, 10 pages.
Korean Office Action for Korean Application No. 10-2016-7015470, dated Sep. 30, 2019 with translation, 9 pages.

\* cited by examiner

METHOD FOR DETECTING A MEASUREMENT ERROR IN A ROBOTIC CLEANING DEVICE

This application is a U.S. National Phase application of PCT International Application No. PCT/EP2014/078144, filed Dec. 17, 2014, which claims the benefit of SE 1450886-5, filed Jul. 10, 2014, both of which are incorporated herein by reference.

TECHNICAL FIELD

The invention relates to a robotic cleaning device and a method for the robotic cleaning device of detecting measurement errors in an obstacle detecting device of the robotic cleaning device.

BACKGROUND

In many fields of technology, it is desirable to use robots with an autonomous behaviour such that they can freely move around a space without colliding with possible obstacles.

Robotic vacuum cleaners are known in the art and usually equipped with drive means in the form of one or more motors for moving the cleaner across a surface to be cleaned. The robotic vacuum cleaners are further equipped with intelligence in the form of microprocessor(s) and navigation means for causing an autonomous behaviour such that the robotic vacuum cleaners can freely move around and clean a space in the form of e.g. a room. Thus, these prior art robotic vacuum cleaners have the capability of more or less autonomously vacuum clean a room, in which furniture such as tables, chairs and other obstacles such as walls and stairs are located. These robotic vacuum cleaners have navigated a room by means of using structured light, such as e.g. line laser beams, to illuminate obstacles to be detected and registering laser light directly reflected from the obstacles back towards the cleaner in order to determine where the obstacles are located in the room. Images are continuously captured by a camera of the obstacle detecting device of the robotic cleaning device, and distance to the illuminated obstacle such as a wall or a floor can be estimated by detecting the directly reflected laser line in the captured images and using trigonometric functions based on the known position of the cleaner, such that a 3D representation of the room subsequently can be created relative to the robot cleaner. In order to detect a distance to an illuminated object, the structured light source is usually arranged at a known distance, a so called base line, from the camera or the like on the robot cleaner. In addition the structured light source is preferably arranged at a known angle to make sure that the reflected light line of the structured light source is within the field of view of the camera.

For calculating or estimating distances between the robot cleaner and objects/landmarks a trigonometric formula or algorithm is used, as mentioned above. In these algorithms a fixed parameter for value of the known angle at which the structured light source is arranged and a further fixed parameter for the length of the base line are used. These parameters are usually determined by tests in the factory for each robot cleaner after their production. Alternatively these parameters may be pre-set in the processing unit comprising the algorithm during the production.

A problem is that the actual length of the base line and/or the actual angle at which the structured light source is arranged can change over time due to temperature changes within the robot cleaner, due to vibrations for example during transport, changes in the material in which the structured light source is embedded, etc. In particular changes in the actual angle at which the structured light source is arranged may occur in errors when distances are estimated using the obstacle detecting device and a trigonometric algorithm. It follows that measurements performed by using the camera and the structured light source are in some cases not accurate or they may change over time. In such a case the robot cleaner needs to be checked and verified so that the parameters can be calibrated/adjusted.

SUMMARY

An object of the present invention is to provide a robotic cleaning device that is configured to detect measurement errors occurring in the obstacle detecting device and the processing unit, respectively.

Advantageously the robotic cleaning device is configured to autonomously calibrate parameters in an algorithm used to estimate positions of the robotic cleaning device in view of objects/landmarks.

The general idea of the robotic cleaning device and the method for detecting measurement errors performed by the robotic cleaning device is to identify a landmark, for example a flat wall, to estimate the distance to the landmark by using the obstacle detecting device and then to use dead reckoning within the robotic cleaning device to determine an actual distance to the landmark by moving from the current position into contact with the landmark. The measurement error may then be determined by comparing the distance obtained by the camera, the structured light source and a processor with the actual distance obtained by dead reckoning.

Disclosed herein is a method for detecting measurement errors in an obstacle detecting device of a robotic cleaning device comprising the steps of estimating a distance to a landmark relative to the robotic cleaning device by illuminating the landmark with structured light and extracting information from the reflections of the structured light, moving into contact with the landmark while dead reckoning an actual distance to the landmark and comparing the actual distance with the distance for detecting a measurement error in the obstacle detecting device.

In the above method the robotic cleaning device may even be configured to obtain an estimation about the location of the landmark.

The robotic cleaning device is thus capable of detecting measurement errors during operation. There is no need for sending the robotic cleaning device to the producer for detecting errors. The robotic cleaning device is thus very autonomous and user-friendly.

In an embodiment the method may comprise the step of repeating some or all of the above steps several times by moving back away from the landmark and again in contact with the landmark.

Thereby the distances do not need to be the same at each measurement.

The landmark may preferably be a flat and immobile landmark such as a wall or the like.

In a further embodiment the method may comprise the step of determining whether the detected measurement errors are consistent.

This is advantageous since a one time measurement may not be representative as wheels of the robotic cleaning device may spin during the moving towards the landmark. Another potential problem may be that dirt on the floor affects the movement path of the robotic cleaning device when it moves into contact with the landmark. It may thus be preferred to perform the measurement several times to detect consistent measurement errors.

When a detected measurement error is discovered to be consistent over several times of performing the method, a parameter in a distance calculating algorithm may be adjusted.

This calibration step may help to provide a robotic cleaning device that is capable of continuously measure accurately over a long period of operating.

In an embodiment the parameter in the distance calculating algorithm may be a value for an angle at which the structured light source is arranged in relation to a direction of view of the camera of the obstacle detecting device.

Other parameters relating for example to a base line may be adjusted, which base line is a distance between the camera and the structured light source of the obstacle detecting device.

In an embodiment of the method some or all of the above steps may be performed after a predetermined operating time has elapsed.

In a further embodiment some or all of the above steps may be performed if a vibration and/or temperature sensor detects a temperature above or below a temperature threshold.

A high temperature within the robotic cleaning device, for example during cleaning in a well-lit room in summer or after a long period of operating, may affect the material in which the structured light source is embedded and/or the material of the structured light source itself. A temperature threshold may prevent measurement errors originating from high or low temperatures.

Alternatively or additionally the temperature sensor may be a vibration sensor or the like that registers vibrations or shocks and that is configured to initiate a measurement error detection after such a period of vibration or a shock has occurred.

In a further embodiment some or all of the above steps may be initiated if the robotic cleaning device has been in an idle mode for a predetermined period of time.

A long idle period, for example storage, may expose the robotic cleaning to high/low temperatures, humidity and other stresses that may affect the actual angle or the actual base line. The robotic cleaning device will thus perform some or all of the above steps once the robotic cleaning device has been idle for a predetermined period of time to provide improved accuracy.

Disclosed herein is further a robotic cleaning device comprising a main body, a propulsion system arranged to move the robotic cleaning device, a contact detecting portion connected to the main body and arranged to detect if the robotic cleaning device is in contact with an object and a dead reckoning sensor connected to the propulsion system. The robotic cleaning device further comprises an obstacle detecting device comprising a 3D sensor system, which may for example be a 3D camera system, a 3D laser system, etc., and a first structured light source arranged at a distance from each other on the main body and a processing unit arranged to control the propulsion system. The obstacle detecting device is arranged to position a landmark relative to the robotic cleaning device by illuminating the landmark with structured light from the first structured light source. The processing unit is arranged to estimate a distance to the landmark based on a detected reflection of the structured light and subsequently moving the robotic cleaning device into contact with the landmark while measuring an actual distance to the landmark via the dead reckoning sensor, whereby the actual distance is then compared with the distance for detection of a measurement error.

The robotic cleaning device is thus advantageously configured to autonomously detect a measurement error. The actual distance as measured by the dead reckoning sensor is considered to be the accurate distance.

In a further embodiment the robotic cleaning device may comprise a second structured light source.

In an embodiment the first and/or second structured light source may be arranged at an angle in relation to a front end portion of the main body of the robotic cleaning device and the direction of view of a camera of the obstacle detecting device, respectively.

The angle may ensure that the projected light line from the first and/or second structured light source is actually in the field of vision of the 3D camera system.

In a further embodiment the processing unit may be configured to measure and store the measurement errors from several measurements and wherein the processing unit may detect if the measurement errors are consistent or not.

As described above, this may help to avoid that a one time error during the measurement method, has an influence on the detection of a real, consistent measurement error(s).

In another embodiment the processing unit may comprise a distance calculating algorithm with a parameter representing the angle at which the first and/or second structured light source is arranged and wherein the processing unit calibrates the parameter if it is detected that the measurement errors are consistent.

In an embodiment the robotic cleaning device may comprise at least one impact and/or temperature sensor, which is arranged in communication with the processing unit.

The impact and/or temperature sensor may register high temperatures around or within the robotic cleaning device and/or vibrations so that the processing unit may initiate the method according to some or all of the above steps.

In another embodiment the processing unit may comprises a timer.

The timer may be used to determine whether or not it is necessary to initiate the method according to some or all of the above steps and thus whether or not it is necessary to calibrate the robotic cleaning device.

The invention further relates to a computer program comprising computer-executable instructions for causing a robotic cleaning device to perform some or all of the above steps when the computer-executable instructions are executed on a processing unit included in the robotic cleaning device.

The invention further relates to a computer program product comprising a computer readable storage medium, the computer readable storage medium comprising the computer program according to the above paragraph embodied therein.

Generally, all terms used in the claims are to be interpreted according to their ordinary meaning in the technical field, unless explicitly defined otherwise herein. All references to "a/an/the element, device, apparatus, component, means, step, etc." are to be interpreted openly as referring to at least one instance of the element, device, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The invention relates to robotic cleaning devices, or in other words, to automatic, self-propelled machines for cleaning a surface, e.g. a robotic vacuum cleaner, a robotic sweeper or a robotic floor washer. The robotic cleaning device 10, 10' according to the invention can be mains-operated and have a cord, be battery-operated or use any other kind of suitable energy source, for example solar energy.

Figure 1:
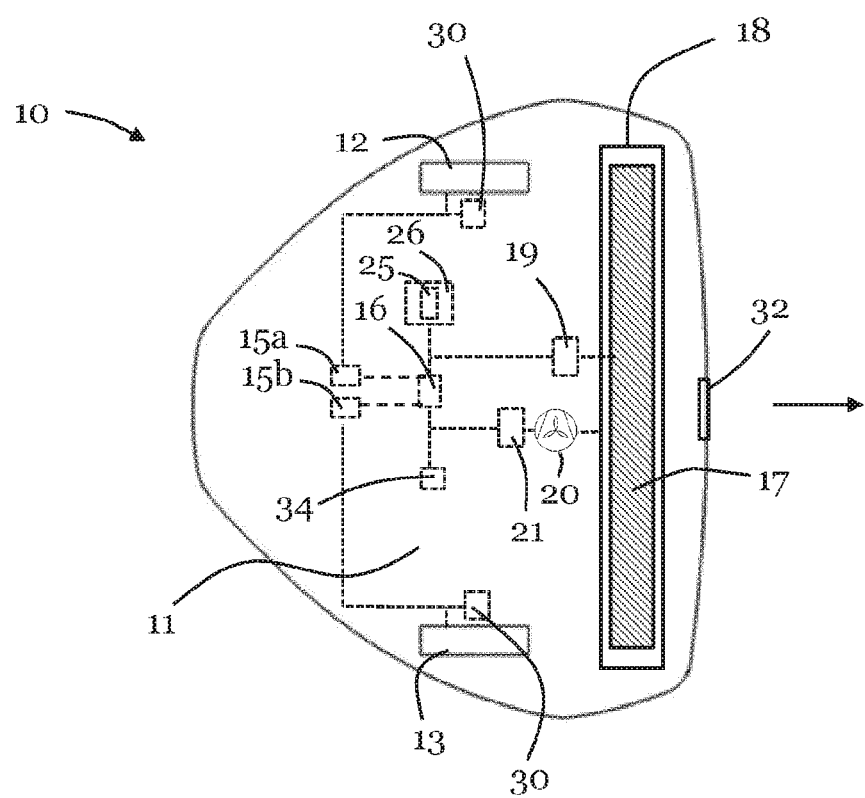
FIG. 1 illustrates schematically an embodiment of the robotic cleaning device according to the invention in a bottom up view, whereby a bottom of a main body is illustrated transparent to show various components of the robotic cleaning device.

FIG. 1 shows a robotic cleaning device 10 according to an embodiment of the present invention in a bottom view, i.e. the bottom side of the robotic cleaning device 10 is shown. The arrow indicates the forward direction of the robotic cleaning device. The robotic cleaning device 10 comprises a main body 11 housing components such as a propulsion system comprising driving means in the form of two electric wheel motors 15a, 15b for enabling movement of the driving wheels 12, 13, such that the cleaning device can be moved over a surface to be cleaned. Each wheel motor 15a, 15b is capable of controlling the respective driving wheel 12, 13 to rotate independently of each other in order to move the robotic cleaning device 10 across the surface to be cleaned. A number of different driving wheel arrangements, as well as various wheel motor arrangements, may be envisaged. It should be noted that the robotic cleaning device 10 may have any appropriate shape, such as a device having a more traditional circular-shaped main body, or a triangular-shaped main body.

As an alternative to the above described propulsion system, a track propulsion system may be used or even a hovercraft propulsion system.

The propulsion system is further connected to two dead reckoning sensors 30, 30', one assigned to each driving wheel 12, 13, as illustrated in FIG. 1. The dead reckoning sensors 30, 30' are configured to independently measure distances travelled by the robotic cleaning device 10 by observing the movement and turns, respectively, of the driving wheels 12, 13, in order to help to position the robotic cleaning device 10, for example within a room.

The embodiment of the robotic cleaning device 10 as illustrated in FIG. 1 comprises two dead reckoning sensors 30, 30', it is however possible to envisage robotic cleaning devices comprising only one dead reckoning sensor 30, 30'.

A controller 16 such as a microprocessor controls the wheel motors 15a, 15b to rotate the driving wheels 12, 13 as required in view of information received from an obstacle detecting device (not shown in FIG. 1a) for detecting obstacles in the form of walls, floor lamps, table legs, around which the robotic cleaning device must navigate. The dead reckoning sensors 30, 30' are connected to the controller 16, for example via the electric wheel motors 15a, 15b, as illustrated in FIG. 1. The obstacle detecting device may be embodied in the form of infrared (IR) sensors and/or sonar sensors, a microwave radar, a 3D sensor system registering its surroundings, implemented by means of e.g. a 3D camera, a camera in combination with lasers, a laser scanner, etc. for detecting obstacles and communicating information about any detected obstacle to the controller 16, which may be embodied in the form of a microprocessor or processing unit 16. The microprocessor 16 communicates with the wheel motors 15a, 15b to control movement of the wheels 12, 13 in accordance with information provided by the obstacle detecting device such that the robotic cleaning device 10 can move as desired across the surface to be cleaned. This will be described in more detail with reference to subsequent drawings.

Further, the main body 11 may optionally be arranged with a cleaning member 17 for removing debris and dust from the surface to be cleaned in the form of a rotatable brush roll arranged in an opening 18 at the bottom of the robotic cleaner 10. Thus, the rotatable brush roll 17 is arranged along a horizontal axis in the opening 18 to enhance the dust and debris collecting properties of the cleaning device 10. In order to rotate the brush roll 17, a brush roll motor 19 is operatively coupled to the brush roll to control its rotation in line with instructions received from the controller/microprocessor 16.

Moreover, the main body 11 of the robotic cleaner 10 comprises a suction fan 20 creating an air flow for transporting debris to a dust bag or cyclone arrangement (not shown) housed in the main body via the opening 18 in the bottom side of the main body 11. The suction fan 20 is driven by a fan motor 21 connected to the controller 16 from which the fan motor 21 receives instructions for controlling the suction fan 20. It should be noted that a robotic cleaning device 10 having either one of the rotatable brush roll 17 and the suction fan 20 for transporting debris to the dust bag may be envisaged. A combination of the two will however enhance the debris-removing capabilities of the robotic cleaning device 10.

Alternatively, the robotic cleaning device 10 may comprise a mop (not shown) and/or a rotating floor brush (not shown).

With further reference to FIG. 1, the controller/processing unit 16 embodied in the form of one or more microprocessors is arranged to execute a computer program 25 downloaded to a suitable storage medium 26 associated with the microprocessor, such as a Random Access Memory (RAM), a Flash memory or a hard disk drive. The controller 16 is arranged to carry out a method according to embodiments of the present invention when the appropriate computer program 25 comprising computer-executable instructions is downloaded to the storage medium 26 and executed by the controller 16. The storage medium 26 may also be a computer program product comprising the computer program 25.

Alternatively, the computer program 25 may be transferred to the storage medium 26 by means of a suitable computer program product, such as a digital versatile disc (DVD), compact disc (CD) or a memory stick. As a further alternative, the computer program 25 may be downloaded to the storage medium 26 over a network. The controller 16 may alternatively be embodied in the form of a digital signal processor (DSP), an application specific integrated circuit (ASIC), a field-programmable gate array (FPGA), a complex programmable logic device (CPLD), etc.

In FIG. 1 is further a contact detecting portion 32 illustrated. The contact detecting portion 32 is arranged at a front end of the robotic cleaning device 10 as seen in a direction of movement. The contact detecting portion 32 may extend over the whole front side of the robotic cleaning device 10, similar to a park distance sensor of a modern car. Alternatively, the contact detecting portion 32 may only extend over the front extremity of the robotic cleaning device 10, as illustrated in FIG. 1. The contact detecting portion 32 is arranged in order to detect whether or not the robotic cleaning device 10 is in contact with an object or landmark. This may be useful when a collision with obstacles has to be avoided and in case the measurement of the obstacle detecting device has to be verified, as will be described later herein, referring to FIGS. 4 and 5.

Additionally, the robotic cleaning device 10 may comprise a vibration and/or temperature sensor 34 operatively connected to the controller 16. The vibration and/or temperature sensor 34 may be configured to register the temperature within the robotic cleaning device 10 and to initiate a method for checking parameters in an algorithm when the temperature is above a certain temperature threshold, as will be described later herein. The vibration and/or temperature sensor 34 may further be used to register vibrations, which may for example occur if the robotic cleaning device collides with objects or if it falls over an edge, and to initiate the method for checking parameters of the algorithm, as will be described later herein.

Figure 2:
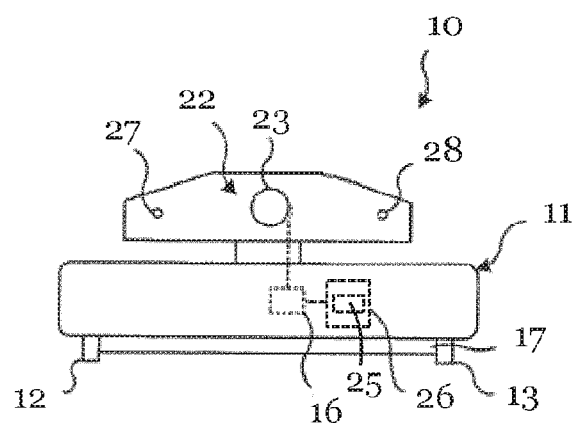
FIG. 2 illustrates schematically a front view of the robotic cleaning device according to an embodiment of the invention.

FIG. 2 shows a front view of the robotic cleaning device 10 according to an embodiment illustrating the previously mentioned obstacle detecting device in the form of a 3D camera system 22 comprising at least a camera 23 and a first and a second structured light source 27, 28, which may be horizontally or vertically oriented line lasers. Further shown is the controller 16, the main body 11, the driving wheels 12, 13, and the rotatable brush roll 17 previously discussed with reference to FIG. 1. The controller 16 is operatively coupled to the camera 23 for recording images of a vicinity of the robotic cleaning device 10. The first and second structured light sources 27, 28 may preferably be vertical line lasers and are arranged lateral of the camera 23 configured to illuminate a height and a width that is greater than the height and width of the robotic cleaning device 10. Further, the field of view of the camera 23 is preferably smaller than the space illuminated by the first and second structures light source 27, 28. The camera 23 is controlled by the controller 16 to capture and record a plurality of images per second. Data from the images is extracted by the controller 16 and the data is typically saved in the memory 26 along with the computer program 25.

The first and second structured light sources 27, 28 are configured to scan, preferably in a vertical orientation, the vicinity of the robotic cleaning device 10, normally in the direction of movement of the robotic cleaning device 10.

The first and second structured light sources 27, 28 are configured to send out laser beams, which illuminate furniture, walls and other objects of a home or room. The camera 23 is controlled by the controller 16 to capture and record images from which the controller 16 creates a representation or layout of the surroundings that the robotic cleaning device 10 is operating in, by extracting features from the images and by measuring the distance covered by the robotic cleaning device 10, while the robotic cleaning device 10 is moving across the surface to be cleaned. Thus, the controller 16 derives positional data of the robotic cleaning device 10 with respect to the surface to be cleaned from the recorded images, generates a 3D representation of the surroundings from the derived positional data and controls the driving motors 15a, 15b to move the robotic cleaning device across the surface to be cleaned in accordance with the generated 3D representation and navigation information supplied to the robotic cleaning device 10 such that the surface to be cleaned can be navigated by taking into account the generated 3D representation. Since the derived positional data will serve as a foundation for the navigation of the robotic cleaning device 10, it is important that the positioning is correct; the robotic cleaning device will otherwise navigate according to a "map" of its surroundings that is misleading.

The 3D representation generated from the images recorded by the 3D camera system 22 thus facilitates detection of obstacles in the form of walls, floor lamps, table legs, around which the robotic cleaning device 10 must navigate as well as rugs, carpets, doorsteps, etc., that the robotic cleaning device 10 must traverse. The robotic cleaning device 10 is hence configured to learn about its environment or surroundings by operating/cleaning.

With respect to FIG. 2, for illustrational purposes, the 3D camera system 22 is separated from the main body 11 of the robotic cleaning device 10. However, in a practical implementation, the 3D camera system 22 is likely to be integrated with the main body 11 of the robotic cleaning device 10 to minimize the height of the robotic cleaning device 10, thereby allowing it to pass under obstacles, such as e.g. a sofa.

Figure 3:
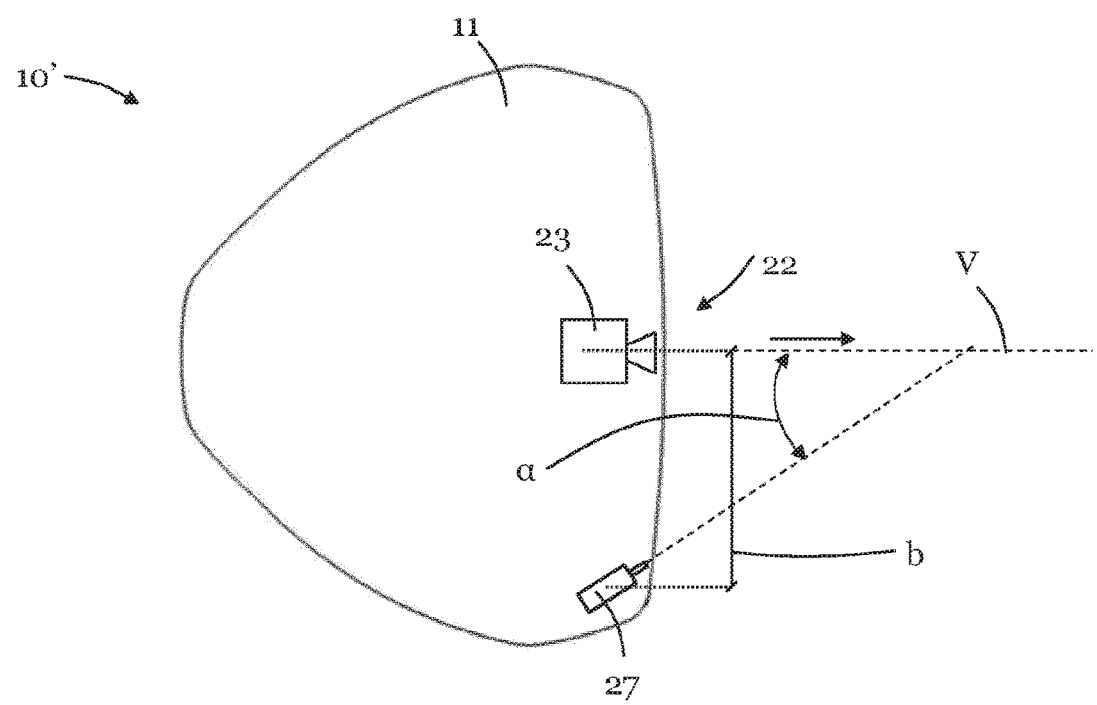
FIG. 3 illustrates schematically a top down view onto the robotic cleaning device according to an embodiment of the invention.
Figure 4:
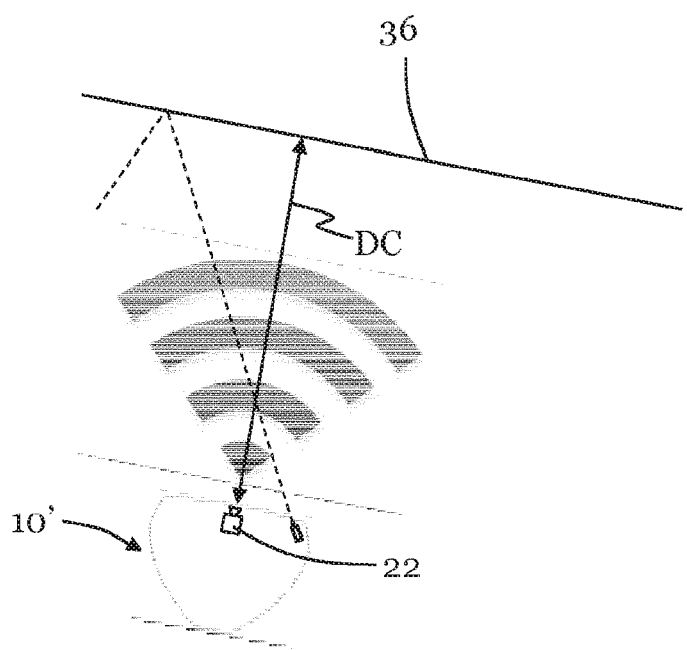
FIG. 4 illustrates schematically how the robotic cleaning device estimates a distance to a landmark.
Figure 5:
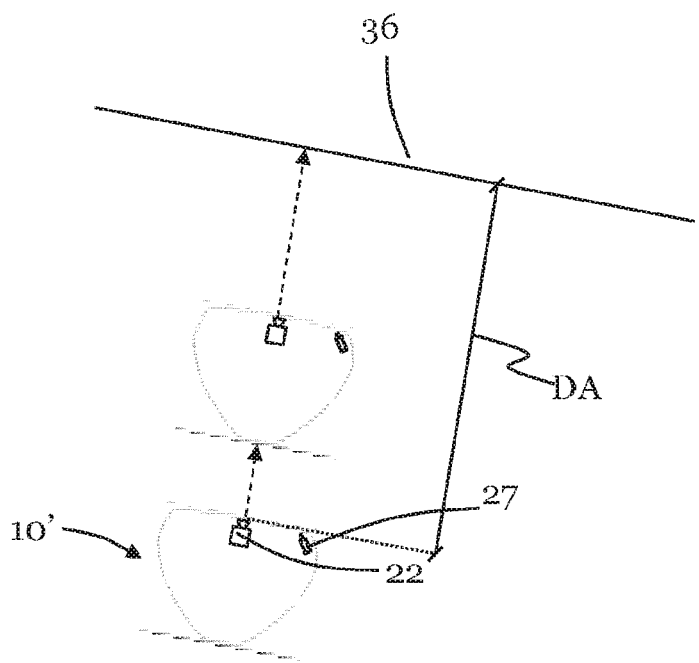
FIG. 5 illustrates schematically how the robotic cleaning device measures an actual distance to the landmark by dead reckoning.
Figure 6:
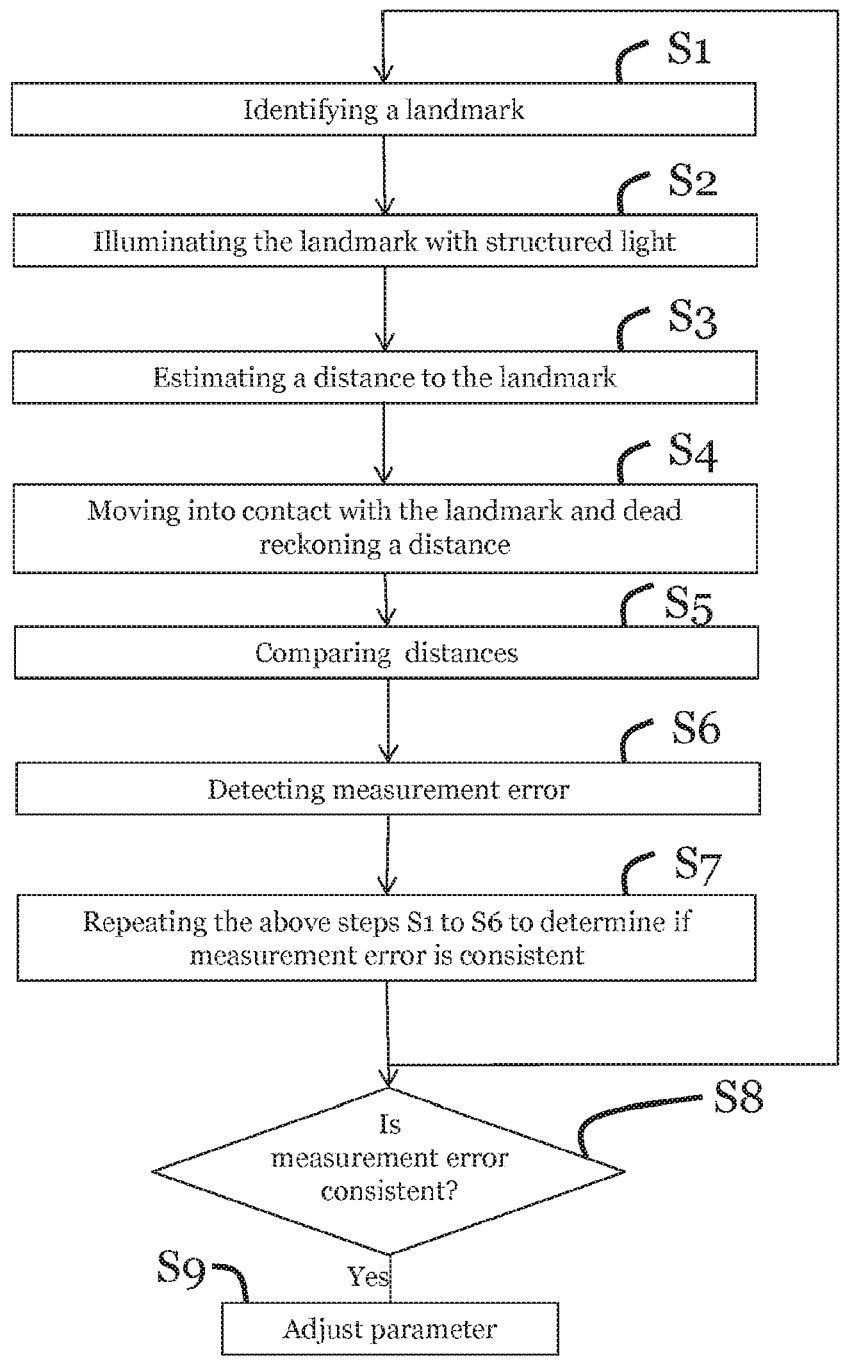
FIG. 6 illustrates a method steps according to a method of the invention.

FIG. 3 illustrates a top down view onto a robotic cleaning device 10' according to another embodiment of the invention, whereby the 3D camera system 22 comprises only the first structured light source 27 which is arranged at an angle α to a main direction of view V of the camera 23 as illustrated in FIG. 3. As described above, there may be two structured light sources 27, 28 arranged on the robotic cleaning device 10. In FIG. 3 a base line b is further illustrated. The base line b corresponds to the distance between the camera 23 and the structured light source 27, as measured perpendicular to the main direction of view V of the camera 23. The camera 23 and the structured light source 27 may be embedded in the material of the main body 11. Over time the angle α and/or the actual value of the base line b may change, for example due to material shrinkage, material aging, humidity, vibrations, temperature, etc., affecting the measurement and estimation of distances performed by the 3D camera system 23 and the obstacle detecting device, respectively. FIGS. 4 to 6 illustrate a method to verify and calibrate the above parameters, which represent values for the angle α and the base line b, in a distance calculating algorithm.

FIG. 4 illustrates how the robotic cleaning device 10' identifies S1 (c.f. FIG. 6) a landmark 36, such as for example a flat wall, illuminates S2 (c.f. FIG. 6) the landmark 36 with light from the structured light source 27 and estimates S3 (c.f. FIG. 6) a distance DC to the landmark 36 by analysing the reflected light originating form the structured light source 27. During the identification S1 of the landmark 36 the robotic cleaning device 10' may rotate essentially on the spot in order to produce a map of the landmark 36, in case the landmark 36 is not already stored in an internal map of the robotic cleaning device 10'. The distance DC may preferably be a distance which is the shortest distance to the landmark 36; it does however not need to be the shortest distance. As previously described, the distance DC is obtained via an algorithm that is on the controller or microprocessor 16 using trigonometric functions and fixed parameters which represent the base line b and the angle α (c.f. FIG. 3).

In order to detect a measurement error during the estimation S3 of the distance DC the actual distance DA has to be determined. This may be done according to FIG. 5. After estimating S3 the distance DC, the robotic cleaning device 10' moves S4 (c.f. FIG. 6) into contact with the landmark 36, as illustrated in FIG. 5, and measures the actual distance DA by using dead reckoning and the dead reckoning sensors 30, 30', respectively. Contact with the landmark 36 will be registered as soon as the contact detecting portion 32 (c.f. FIG. 1) detects physical contact with the landmark 36.

By comparing S5 (c.f. FIG. 6) the distance DC with the actual distance DA a measurement error resulting from the parameters representing the angle α and/or the base line b in the algorithm may be detected S6 (c.f. FIG. 6). As the angle α is the most sensitive parameter in the algorithm, thus the parameter with highest influence on the estimation S3, the measurement error is in most cases originating in a wrong parameter representing this angle α. Thus in case there is a measurement error, the parameter representing the angle α is in most cases the source of the error. Therefore a measurement error means that the parameter representing the angle α does not correspond any longer with the actual angle α, because the actual angle α changed since the last calibration or since the production of the robotic cleaning device 10, 10'.

FIG. 6 illustrates the steps S1 to S6. The measurement error of one single measurement performed according to steps S1 to S6 may be a once-off, as previously described. To prevent once-off measurement errors in measuring the actual distance DA having a high influence on the measurement error detection S6, the steps of identifying S1 the landmark 36, illuminating S2 the landmark 36, estimating S3 a distance DC to the landmark 36, moving S4 into contact with the landmark 36, comparing S5 the distance DC with the actual distance DA and detecting S6 a measurement error to determine whether or not the measurement error is actually consistent or not, may be repeated S7, several times. This may for example be done by performing a number of repetitive measurements and statistically analyse the standard deviation of the detected measurement errors, if any. This can be done automatically in the controller/microprocessor 16. In order to repeat steps S1 to S6 the robotic cleaning device 10, 10' moves back away from the landmark 36 and repeats the steps S1 to S6. The actual distance DA as illustrated in FIG. 5, does thereby not need to be the same for each measurement (steps S1 to S6).

If it is discovered S8, after the number of repetitive measurements that the measurement errors are consistent, the parameter representing the angle α and/or the parameter representing the base line b in the distance calculating algorithm may be adjusted S9, as illustrated in FIG. 6.

The above described method may be performed after a predetermined operating time of the robotic cleaning device 10, 10' has passed and/or after the vibration and/or temperature sensor 34 has registered a vibration and/or after the vibration and/or temperature sensor 34 has registered a temperature within or around the robotic cleaning device 10, 10' that is above or below a predetermined temperature threshold.

In case the robotic cleaning device 10 (not shown in FIGS. 3 to 5) comprises the first and the second structured light source 27, 28, the parameter representing both angles, the angle α and the angle at which the second structured light source 28 is arranged in view of direction of view V of the camera, may be adjusted.

In a further embodiment it may be possible to check or verify the two angles described in the previous paragraph independently from each other. In another embodiment the two angles may be checked depending on each other by using average values. Preferably the angle α at which the first structured light source 27 is arranged and the angle (not illustrated in the figures) at which the second structured light source 28 is arranged are the same, which makes it easier to verify and increase accuracy, as described above.

During the whole method the actual distance DA is considered to be accurate. Although for example a spin of one of the driving wheels 12, 13 may result in an inaccurate actual distance DA, the repetitive measurements according to above described steps S1 to S6 may exclude or at least reduce the influence of such a once-off error coming from a wrongly measured actual distance. In principle, error measurements that are found by the controller to be wrong (due to deviation from a pattern of measurements) can be ignored or discarded when determining consistent errors.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for detecting measurement errors in an obstacle detecting device of a robotic cleaning device, the method comprising:
   estimating an estimated distance to a landmark by illuminating the landmark with structured light and extracting information from reflections of the structured light;
   moving into contact with the landmark while dead reckoning an actual distance to the landmark;
   comparing the actual distance with the estimated distance to determine a measurement error in the obstacle detecting device; and
   determining whether a vibration sensor detects a vibration above a vibration threshold and/or temperature sensor detects a temperature above or below a temperature threshold, and performing one or more of the estimating, moving and comparing steps if the vibration is above the vibration threshold and/or if the temperature is above or below the temperature threshold.

2. The method according to claim 1, further comprising repeating the estimating, moving and comparing steps a plurality of times by moving back away from the landmark and again into contact with the landmark.

3. The method according to claim 2, further comprising determining whether respective measurement errors generated during each repetition of the estimating, moving and comparing steps are consistent.

4. The method according to claim 3, further comprising adjusting a parameter in a distance calculating algorithm if it is determined that the respective measurement errors are consistent.

5. The method according to claim 4, wherein the parameter in the distance calculating algorithm is a value for an angle at which a structured light source is arranged in relation to a direction of view of the obstacle detecting device.

6. The method according to claim 1, further comprising determining whether a predetermined operating time of the robotic cleaning device has elapsed, and performing one or more of the estimating, moving and comparing steps if the predetermined operating time has elapsed.

7. A robotic cleaning device comprising:
a main body;
a propulsion system arranged to move the robotic cleaning device;
a contact detecting portion connected to the main body and arranged to detect if the robotic cleaning device is in contact with an object;
a dead reckoning sensor operatively connected to the propulsion system;
an obstacle detecting device comprising a camera and a first structured light source arranged at a distance from each other on the main body,
wherein the first structured light source is arranged at an angle in relation to a direction of view of the camera of the robotic cleaning device; and
a processing unit configured to control the propulsion system;
wherein the obstacle detecting device is arranged to:
detect a landmark relative to the robotic cleaning device by illuminating the landmark with structured light from the first structured light source, wherein the processing unit is arranged to estimate an estimated distance to the landmark based on a detected reflection of the structured light,
move the robotic cleaning device into contact with the landmark while measuring an actual distance to the landmark via the dead reckoning sensor, and
compare the actual distance with the estimated distance to determine a measurement error.

8. The robotic cleaning device according to claim 7, wherein the processing unit is configured to determine a plurality of measurement errors, and wherein the processing unit is further configured to detects if the measurement errors are consistent or not.

9. The robotic cleaning device according to claim 8, wherein the processing unit comprises a distance calculating algorithm with a parameter representing the angle and wherein the processing unit calibrates the parameter if it is determined that the measurement errors are consistent.

10. The robotic cleaning device according to claim 7, comprising at least one of a vibration sensor or a temperature sensor arranged in communication with the processing unit.

11. The robotic cleaning device according to claim 7, wherein the processing unit comprises a timer.

12. A method for detecting measurement errors in an obstacle detecting device of a robotic cleaning device, the method comprising:
estimating an estimated distance to a landmark by illuminating the landmark with structured light and extracting information from reflections of the structured light;
moving into contact with the landmark while dead reckoning an actual distance to the landmark;
comparing the actual distance with the estimated distance to determine a measurement error in the obstacle detecting device; and
determining whether the robotic cleaning device has been in an idle mode for a predetermined period of time, and performing one or more of the estimating, moving and comparing steps if the robotic cleaning device has been in an idle mode for a predetermined period of time.

13. The method according to claim 12, further comprising repeating the estimating, moving and comparing steps a plurality of times by moving back away from the landmark and again into contact with the landmark.

14. The method according to claim 13, further comprising determining whether respective measurement errors generated during each repetition of the estimating, moving and comparing steps are consistent.

15. The method according to claim 14, further comprising adjusting a parameter in a distance calculating algorithm if it is determined that the respective measurement errors are consistent.

16. The method according to claim 15, wherein the parameter in the distance calculating algorithm is a value for an angle at which a structured light source is arranged in relation to a direction of view of the obstacle detecting device.

17. The method according to claim 12, further comprising determining whether a predetermined operating time of the robotic cleaning device has elapsed, and performing one or more of the estimating, moving and comparing steps if the predetermined operating time has elapsed.

* * * * *